(12) United States Patent
Finseth et al.

(10) Patent No.: US 7,739,711 B2
(45) Date of Patent: *Jun. 15, 2010

(54) ELECTRONIC TELEVISION PROGRAM GUIDE WITH CALENDAR TOOL

(75) Inventors: Craig A. Finseth, St. Paul, MN (US); Philip E. Hsiao, Eden Prairie, MN (US); Jeffrey A. Brown, Roseville, MN (US)

(73) Assignee: The DIRECTV Group, Inc., El Segundo, CA (US)

( * ) Notice: Subject to any disclaimer, the term of this patent is extended or adjusted under 35 U.S.C. 154(b) by 1299 days.

This patent is subject to a terminal disclaimer.

(21) Appl. No.: 10/771,701

(22) Filed: Feb. 4, 2004

(65) Prior Publication Data

US 2004/0158857 A1 Aug. 12, 2004

Related U.S. Application Data

(63) Continuation of application No. 09/536,075, filed on Mar. 24, 2000, now Pat. No. 6,742,184.

(60) Provisional application No. 60/126,696, filed on Mar. 29, 1999.

(51) Int. Cl.
*G06F 3/00* (2006.01)
*G06F 13/00* (2006.01)
*H04N 5/445* (2006.01)

(52) U.S. Cl. .......................................... 725/52; 725/53

(58) Field of Classification Search ............. 725/39–55; D19/20–25

See application file for complete search history.

(56) References Cited

U.S. PATENT DOCUMENTS

| | | | | |
|---|---|---|---|---|
| 4,216,596 A | * | 8/1980 | Brown | 40/118 |
| 4,720,123 A | * | 1/1988 | Chelius | D19/20 |
| 5,623,613 A | | 4/1997 | Rowe et al. | |
| 5,671,411 A | | 9/1997 | Watts et al. | |
| 5,686,954 A | | 11/1997 | Yoshinobu et al. | |
| 5,699,107 A | | 12/1997 | Lawler et al. | |
| 5,835,087 A | | 11/1998 | Herz et al. | |

(Continued)

OTHER PUBLICATIONS

"Canada Population Density 1976" map. Printed 1985. Accessed from http://atlas.nrcan.gc.ca/site/english/maps/archives/5thedition/peopleandsociety/population/mcr4064.*

(Continued)

*Primary Examiner*—Scott Beliveau
*Assistant Examiner*—Bennett Ingvoldstad

(57) ABSTRACT

The present invention is described by an electronic program guide with a calendar tool, and a method and apparatus for transmitting and receiving the electronic program guide. The apparatus includes a transmission station and a plurality of receiver stations. The transmission station creates program guide data that is in an "object" format. The transmission station combines the program guide objects with digital audio and video television signals, and transmits an output stream to the plurality of receiver stations. Each of the plurality of receiver stations stores electronic program guide objects. Using data from the electronic program guide objects, the plurality of receiver stations generate a listing of television program representations, and a calendar image separate from and adjacent to the plurality of television program representations. The calendar image includes a selection indicator for selecting a date and time, and includes a plurality of program indicators that provide indications of the dates on which a set of television programs will be broadcast.

39 Claims, 18 Drawing Sheets

U.S. PATENT DOCUMENTS

| | | | |
|---|---|---|---|
| 5,850,218 A | 12/1998 | LaJoie et al. | |
| 5,880,768 A | 3/1999 | Lemmons et al. | |
| 5,936,625 A * | 8/1999 | Kahl et al. | 715/775 |
| 6,018,372 A | 1/2000 | Etheredge | |
| 6,064,975 A * | 5/2000 | Moon et al. | 705/8 |
| 6,188,405 B1 | 2/2001 | Czerwinski et al. | |
| 6,192,346 B1 * | 2/2001 | Green | 705/9 |
| 6,216,264 B1 | 4/2001 | Maze et al. | |
| 6,236,987 B1 | 5/2001 | Horowitz et al. | |
| 6,246,442 B1 | 6/2001 | Harada et al. | |
| 6,266,295 B1 | 7/2001 | Parker et al. | |
| 6,268,849 B1 | 7/2001 | Boyer et al. | |
| 6,281,898 B1 | 8/2001 | Nikolovska et al. | |
| 6,323,911 B1 | 11/2001 | Schein et al. | |
| 6,452,611 B1 | 9/2002 | Gerba et al. | |
| 6,473,751 B1 | 10/2002 | Nikolovska et al. | |
| 6,480,210 B1 | 11/2002 | Martino et al. | |
| 6,481,010 B2 | 11/2002 | Nishikawa et al. | |
| 6,532,589 B1 | 3/2003 | Proehl et al. | |
| 6,754,906 B1 | 6/2004 | Finseth et al. | |
| 2004/0216160 A1 * | 10/2004 | Lemmons et al. | 725/46 |
| 2005/0251822 A1 | 11/2005 | Knowles et al. | |
| 2006/0253869 A1 * | 11/2006 | Boyer et al. | 725/51 |

OTHER PUBLICATIONS

Final Rejection dated Sep. 5, 2008 in U.S. Appl. No. 10/821,346, filed Apr. 9, 2004 by Craig A. Finseth et al.

Non-final Office Action dated Mar. 5, 2008 in U.S. Appl. No. 10/821,346, filed Apr. 9, 2004 by Craig A. Finseth et al.

* cited by examiner

ELECTRONIC TELEVISION PROGRAM GUIDE WITH CALENDAR TOOL

CROSS-REFERENCE TO RELATED APPLICATIONS

This application is a continuation of U.S. patent application Ser. No. 09/536,075, entitled "ELECTRONIC TELEVISION PROGRAM GUIDE WITH CALENDAR TOOL," filed Mar. 24, 2000, now U.S. Pat. No. 6,742,184 by Craig A. Finseth, Philip E. Hsiao, and Jeffrey A. Brown, which application claims benefit of U.S. Patent Application 60/126,696, entitled "ELECTRONIC TELEVISION PROGRAM GUIDE WITH CALENDAR TOOL," by Craig A. Finseth, Philip E. Hsiao, and Jeffrey A. Brown, filed Mar. 29, 1999.

This application is related to the following co-pending and commonly assigned patent application, which is incorporated by reference herein:

application Ser. No. 09/535,235, entitled "CATEGORICAL ELECTRONIC PROGRAM GUIDE," filed on same date herewith, by Philip E. Hsiao, Jeffrey A. Brown, and Craig A. Finseth.

BACKGROUND OF THE INVENTION

1. Field of the Invention

The present invention relates to an electronic television program guide, and more particularly to an electronic television program guide with a calendar tool for facilitating program identification and selection.

2. Description of the Related Art

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital) including digital satellite system (or "DSAT"), as well as other methods. These methods allow channels of television content to be multiplexed and transmitted over a common transmission medium.

Program guides for television programming are known in the art. A common method for obtaining television programming information is by consulting paper television programming guides or schedules. This method of disseminating information, however, has limitations. A paper guide may become obsolete or a schedule may change, rendering the paper copy useless. Additionally, the paper schedule may easily be lost.

Electronic program guides have been proposed to alleviate some of the limitations of paper. One example is a cable system that provides a continuous feed of guide information to a dedicated television channel. The channel displays continuous program listings. The continuous nature of the link allows the guide to be updated and reflect current scheduling information. An alternate method of providing guide content is to send it, along with program content, through satellite transmissions to receiving stations.

Previous program guides have been burdened with limitations. Prior television electronic program guides are based around the use of a scheduling grid. This grid typically involves one axis which corresponds to time and another axis which corresponds to transmission channels. At the intersection of each channel and time slot is a "cell" which typically displays the title of the program that is being shown on that channel at that time. The problem with this grid-type display format is that when the amount of channels available to the user is more than 15 to 20, it becomes necessary for the viewer to scroll further through the listings, bringing up screen after screen of possible programs and channels. Additionally, if the viewer wishes to look ahead in the schedule the viewer must scroll again to another section of the grid in order to get a complete viewing of programs being broadcast later in the day, week, etc.

The number of television channels and programming alternatives available to the consumer has been increasing dramatically. Under the current grid format, an expanding number of channels are being pushed onto a single screen. The result is that the text of the display becomes so small as to become difficult to read, or the titles and descriptions of the programs become truncated so as to provide very little information to the viewer. Due to the overwhelming amount of information and options, it is necessary to have a method of displaying and sorting all the available programming information for the television viewer in an efficient manner.

Collectively, prior electronic program guide systems are frustrating to the viewer because they do not give the viewer an aesthetically pleasing and intuitive way to view information. Adding a description of the program for each active cell in the grid, or requiring the viewer to go through a hierarchy of screens of categories has not alleviated the problem of giving the viewer an intuitive and informative method of determining what programming is available.

SUMMARY OF THE INVENTION

The present invention is an electronic television program guide with a calendar tool, and a method and apparatus for transmitting and receiving the electronic program guide. The invention includes a transmission station and a plurality of receiver stations. The transmission station creates program guide data that is in an "object" format. The transmission station combines the program guide objects with digital audio and video television signals, and transmits an output stream to the plurality of receiver stations. Each of the plurality of receiver stations receives the transmitted output stream and identifies the electronic program guide objects within the output stream. Each of the plurality of receiver stations stores the identified electronic program guide objects.

Using data from the electronic program guide objects, the receiver stations generate a listing of television program representations, and a calendar image separate from and adjacent to the plurality of television program representations. The calendar image includes a plurality of dates and a selection indicator. The selection indicator is movable within the calendar image to select one of the plurality of dates on the calendar image and a particular time. The listing of television program representations represent television programs that are being broadcast at the selected date and time.

In an alternative embodiment, the calendar image includes a plurality of program indicators. Each program indicator is overlaid on one or more of the plurality of dates within the calendar image, thereby providing an indication of the dates on which a set of television programs will be broadcast.

BRIEF DESCRIPTION OF THE DRAWINGS

Referring now to the drawings in which like reference numbers represent corresponding parts throughout:

FIG. 5 shows a preferred embodiment of a program guide with a calendar tool, with the program guide showing programs currently on;

FIG. 14 shows a program guide with a calendar tool indicating dates and times of programs a viewer might like;

DETAILED DESCRIPTION OF PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Transmission of Television Content and Program Guide Data

The present invention is a method and apparatus for providing an electronic television program guide with a calendar tool. The following description begins with a general discussion of the overall system, followed by a more detailed description of the transmission and receiver portions of the system, and concludes with a detailed discussion of preferred embodiments of the electronic television program guide with a calendar tool.

Figure 1:
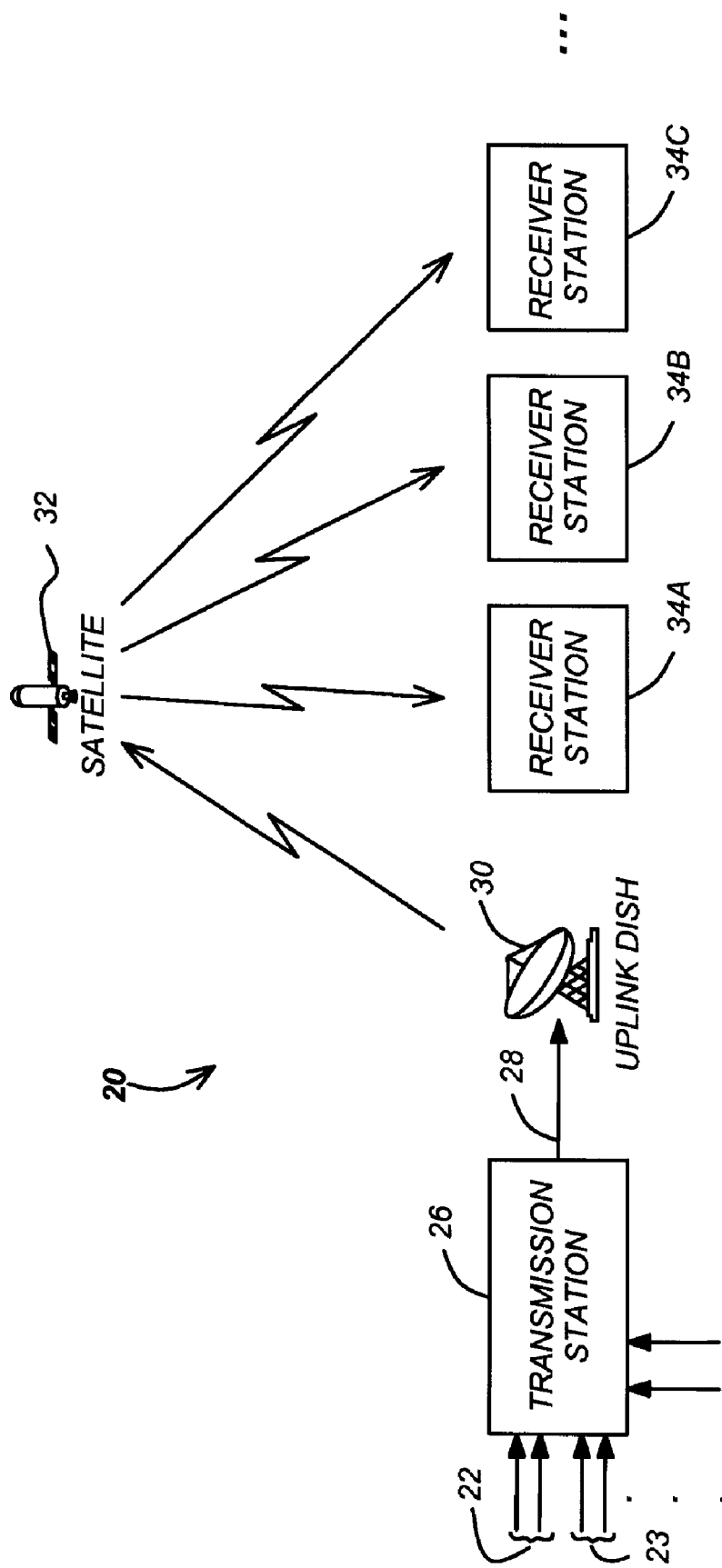
FIG. 1 is a block diagram of a preferred embodiment of a television broadcasting system for the transmission, receipt and display of television content and electronic program guide data.

FIG. 1 is a block diagram of television broadcasting system 20, which transmits and receives audio, video and data signals via satellite. Although the present invention is described in the context of a satellite-based television broadcasting system, the techniques described herein are equally applicable to other methods of television content delivery, such as over-the-air systems and cable-based systems.

Television broadcasting system 20 includes transmission station 26, uplink dish 30, satellite 32, and receiver stations 34A-34C (collectively referred to as receiver stations 34). Transmission station 26 includes a plurality of input lines 22 for receiving various signals, such as analog television signals, digital television signals, video tape signals, original programming signals and computer generated signals comprising HTML content. Additionally, input lines 23 receive signals from digital video servers having hard discs or other digital storage media. Each input line 22 typically corresponds to a single television channel. Transmission station 26 also includes a plurality of schedule feeds 24, which provide electronic schedule information about the timing and content of various television channels, such as that found in television schedules contained in newspapers and television guides. The electronic schedule information from schedule feeds 24 is converted into program guide data by transmission station 26.

Transmission station 26 receives and processes the various input signals received on input lines 22 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques. In a preferred embodiment, output data stream 28 is a multiplexed signal including 16 frequency bands. Transmission station 26 is described in further detail below with respect to FIG. 2.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and to help ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified, frequency shifted signals back to receiver stations 34. A total of 32 transponders are preferably used in the present invention.

Receiver stations 34 receive and process the signals transmitted by satellite 32. Receiver stations 34 include hardware and software for separating the electronic program guide data from the received signals, and processing the electronic program guide data. Receiver stations 34 are described in further detail below with respect to FIG. 3.

Figure 2:
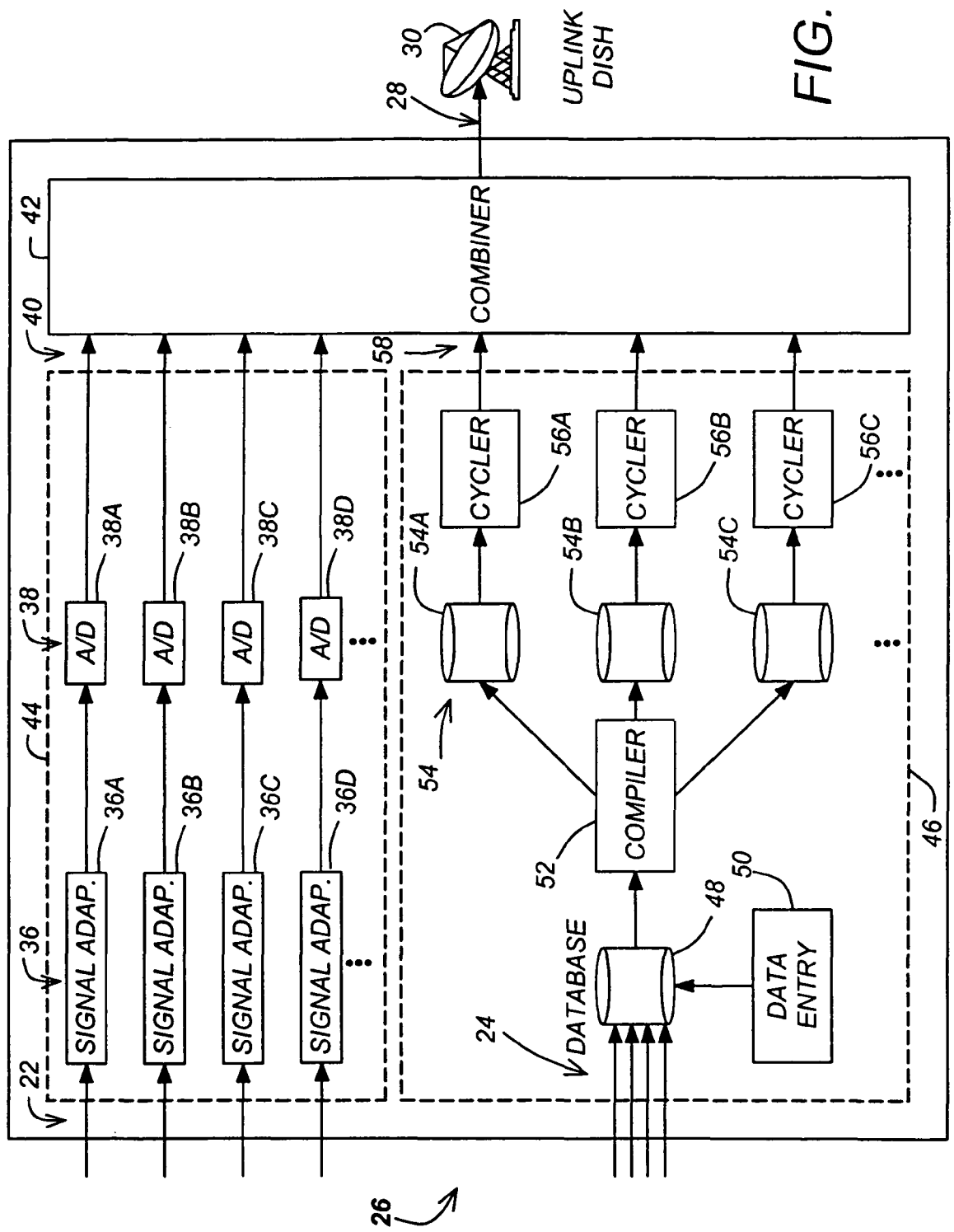
FIG. 2 is a block diagram of the transmission station of the system shown in FIG. 1.

FIG. 2 is a block diagram of transmission station 26. Transmission station 26 includes program transmitting system 44 and program guide transmitting system 46.

Program transmitting system 44 includes input signal adapters 36A-36D (collectively referred to as input signal adapters 36), analog to digital (A/D) converters 38A-38D (collectively referred to as A/D converters 38), and combiner 42. Input signal adapters 36 are coupled to A/D converters 38, and A/D converters 38 are coupled to combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include analog television signals, digital television signals, video tape signals, original programming signals, computer generated signals comprising HTML content and digital video server signals. Also, input lines 22 can receive signals from digital video servers having hard discs or other digital storage media. Input signal adapters 36 preferably convert the input signals to a high quality analog format. The high quality analog signals are output by input signal adapters 36 to A/D converters 38. A/D converters 38 convert the analog signals received from input signal adapters 36 to digital signals, and compress the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Mega bits of data per second are transmitted by uplink dish 30 for each transponder in satellite 32. Each transponder receives and transmits data for about 6 channels. Thus, each channel occupies approximately 5 Mega bits of data per second, on average. During the statistical multiplexing operation, the amount of compression for each channel, and correspondingly the amount of information transmitted for each channel, is adjusted up or down depending upon the amount of available space for each transponder. Combiner 42 feeds back information to A/D converters 38 during the statistical multiplexing operation, informing A/D converters 38 of the amount of bandwidth used by various channels. A/D converters 38 then adjust the amount of compression of a signal based on the information fed back from combiner 42.

The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 3) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives electronic program guide data from input lines 58 (as described below with respect to the program guide transmitting system 46) and adds that data to output data stream 28. The assembly and processing of the electronic program guide data prior to it being sent to combiner 42 is described in more detail below.

Output data stream 28, which is output by combiner 42, is a multiplexed signal that is modulated by combiner 42 using standard frequency and polarization modulation techniques. Output data stream 28 preferably includes 16 frequency bands, with each frequency band being either left polarized or right polarized. Since there are 32 transponders in the preferred embodiment, each of the 16 frequency bands are shared by two transponders. Therefore, transponder 1 is assigned frequency 1, left polarization; transponder 2 is assigned frequency 1, right polarization; transponder 3 is assigned frequency 2, left polarization, etc.

Also shown in FIG. 2 is a block diagram of program guide transmitting system 46, which is a part of transmission station 26. Program guide data transmitting system 46 includes program guide database 48, compiler 52, sub-databases 54A-54C (collectively referred to as sub-databases 54) and cyclers 56A-56C (collectively referred to as cyclers 56).

Schedule feeds 24 provide electronic schedule information about the timing and content of various television channels, such as that found in television schedules contained in newspapers and television guides. Schedule feeds 24 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines to program guide database 48. These companies provide television schedule data for all of the television stations across the nation plus the nationwide channels, such as SHOWTIME, HBO, and the DISNEY CHANNEL. The specific format of the data that are provided by these companies varies from company to company. Program guide database 48 preferably includes schedule data for televisions channels across the entire nation including all nationwide channels and local channels, regardless of whether the channels are transmitted by transmission station 26.

Program guide database 48 is a computer-based system that receives data from schedule feeds 24 and organizes the data into a standard format. Compiler 52 reads the standard form data out of program guide database 48, identifies common schedule portions, converts the program guide data into the proper format for transmission to users (specifically, the program guide data are converted into objects as discussed below) and outputs the program guide data to one or more of sub-databases 54.

Program guide data are also manually entered into program guide database 48 through data entry station 50. Data entry station 50 allows an operator to enter additional scheduling information, as well as combining and organizing data supplied by the scheduling companies. As with the computer organized data, the manually entered data are converted by the compiler into separate objects and sent to one or more of sub-databases 54.

The program guide objects are temporarily stored in sub-databases 54 until cyclers 56 request the information. Each of cyclers 56 preferably transmits objects to combiner 42 at a different rate than the other cyclers 56. For example, cycler 56A may transmit objects to combiner 42 every second, while cyclers 56B and 56C may transmit objects every 5 seconds and every 10 seconds, respectively.

Since receiver 64 (shown in FIG. 3) may not always be on and receiving and saving objects, the objects are continuously re-transmitted. Program guide objects for programs that will be shown in the next couple of hours are sent more frequently than program guide objects for programs that will be shown in 12 hours or more. Thus, the program guide objects for the most current programs are sent to a cycler 56 with a high rate of transmission, while program guide objects for later programs are sent to cyclers 56 with a lower rate of transmission.

All of the objects output by the plurality of cyclers 56 are combined by combiner 42. Combiner 42 combines the objects with the digital video and audio data output by A/D converters 38 on output lines 40. Combiner 42 transmits output data stream 28, which includes the program guide data, HTML data and the digital video and audio data, to uplink dish 30.

Format of Transmitted Program Guide Data

Prior to transmitting program guide data and HTML data to sub-databases 54, compiler 52 organizes the data from program guide database 48 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 52 into multiple frames. Each frame is made up of a plurality of 126 byte packets. Each frame includes a frame header, program guide or other data and a checksum. Each frame header includes the same information as the object header described above—object type, object ID and version number. The frame header uniquely identifies the frame, and its position within a group of frames that make up an object. The checksum is examined by receiver 64 to verify the accuracy of the data within received frames.

The following is a list of preferred object types, although many additional or different object types may be used: Boot object, channel list object, channel object, master schedule object, general schedule object, boot event object, general program object, time object, deletion object, HTML object and a reserved object.

A boot object identifies the SCIDs where all other objects can be found. A boot object is always transmitted on the same channel, which means that each packet of data that makes up a boot object is marked with the same SCID number. Boot objects are transmitted frequently to ensure that receiver stations 34 that have been shut off, and are then turned back on, immediately receive information indicating the location of the various program guide objects. Thus, boot objects are sent from compiler 52 to a cycler 56 with a high rate of transmission.

A channel list object comprises a list of all the channel objects (discussed below) in a network. A network is a grouping of all channels from a common source, such as all Digital Satellite System (DSAT) channels. For each channel object in the list of channel objects, the channel list object includes a channel object ID for that channel object. Each channel object is uniquely identified by its channel object ID.

Each channel object provides information about a particular channel. Each channel object points to a master schedule object (discussed below). Each channel object includes multiple fields or descriptors that provide information about that channel. Each descriptor includes a descriptor type ID that indicates the type of the descriptor. Descriptor types include "about" descriptors, "category" descriptors, "name" descriptors and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A boot event object provides brief information about programs that are currently being broadcast or that will be broadcast in the near future (e.g., within the next two hours) on a particular channel. Thus, each boot event object is associated with one particular channel object, and is not shared among different channel objects. The information provided by the boot event object is not as complete as that provided by a general program object (discussed below). The function of the boot event object is to allow receiver 64 to quickly acquire program information after receiver 64 is powered up. Receiver 64 then continues acquiring complete program information in the background from general program objects. Since the purpose of boot event objects is to provide receiver 64 with immediate program information, boot event objects are transmitted by a cycler 56 that has a high rate of transmission.

A general program object provides a complete description of a program. The general program object is pointed to by other objects (namely, master schedule objects and general schedule objects, which are discussed below) that comprise the starting time and duration of the program. Like channel objects, descriptors are used within program guide objects. General program objects use the same types of descriptors as channel objects. Category descriptors provide a category classification for a program and "about" descriptors provide a description of the program. If compiler 52 determines that a particular program is scheduled to appear on multiple channels, the general program object for that program is transmitted a single time for the multiple channels, although, as discussed above, it may be re-transmitted multiple times.

A general schedule object points to a group of general program objects. A general schedule object is assigned a time duration by a master schedule object (discussed below). Each general schedule object identifies all of the general program objects that must be acquired for the assigned time duration. Each general schedule object is uniquely identified by a schedule object ID. A unique general schedule object may be pointed to by more than one master schedule object. As time progresses and the scheduling information becomes stale, the general schedule object is no longer needed. General schedule objects that are not referenced by any master schedule object are discarded by receiver 64.

A master schedule object comprises the start time of the entire schedule, as well as the start time and duration of the general schedule objects and general program objects. A master schedule object points to general program objects and general schedule objects. The start time of the first general schedule object is given by the schedule start time. The start time of the next general schedule object is the time the previous general schedule object ends. As time progresses and the scheduling information becomes stale, a new master schedule object replaces the previous version, and updates the scheduling information. Thus, the channel object pointing to the master schedule object need not be updated. Only the master schedule object is updated.

A time object provides the current time of day and date at transmission station 26. Time objects include format codes that indicate which part of the date and time is to be displayed. For example, the only part of the date of interest might be the year. Similarly, whenever dates and times are transmitted within an object, the dates and times are accompanied by format codes. The format codes instruct receiver 64 which portion of the transmitted date and time to display.

A deletion object provides a list of object IDs that receiver 64 must discard.

HTML objects provide additional program guide information. Guide information that has been organized and manually entered by operators is converted into HTML objects. HTML objects can be comprised of text, image files in various formats such as GIF and JPEG, and video files in various formats such as Quicktime and MPEG.

HTML objects can be referenced by other HTML objects. For example, a GIF image can be used as an illustration in an HTML text block by referencing the GIF image HTML object from the text HTML object. Additionally, HTML objects can include instructions that typically indicate that certain text should be highlighted and that point at other program guide objects. These referenced instructions are called "hyper-links". The highlighted text associated with a set of nested hyper-link instructions is ultimately displayed on a user's screen, and the displayed text is also referred to as a "hyper-link." Hyper-links that are displayed on a user's screen are selectable by a user using a device such as remote control 86. When a hyper-link is selected, data from HTML objects that are pointed to by the hyper-link are displayed.

Reserved objects are saved for future improvements to the program guide system. When a new type of object is defined, all objects of that new type will include an object header with a reserved object type.

A name system object defines a name system. Each name system object is uniquely identified by a name system object ID. A name system is essentially a table of data that assigns an entry ID for each entry in the table. For example, a name system might be used for program credits. For such a name system, the table would look something like the following:

| Credits Name System (Name System Object ID # 1) | |
| --- | --- |
| Entry | Entry ID # |
| "Actor" | 10 |
| "Director" | 11 |
| "Producer" | 12 |
| "Role" | 13 |

Other names systems include Program Information (e.g., "Title", "Description", "Year of Production", etc.), Languages (e.g., "English", "Spanish", "French", etc.), and Lengths (e.g., "Short", "Medium", "Long", etc.). Name systems are used for any sets of data that are used frequently by receiver 64. The use of name systems reduces transmission bandwidth since frequently used data can be transmitted once, and then referred to later by codes (i.e., Name System Object ID and Entry ID).

When receiver 64 (shown in FIG. 3) receives a name system object, it creates and stores a corresponding name system table comprising the information from the name system object. Each name system table includes a table ID and table entry IDs that correspond to the IDs of the name system object that was used to create the table. Name system tables are stored in memory 78, and are updated by sending additional name system objects with additional entries for the table.

Name system objects also occasionally include matching instructions. The matching instructions associate two or more entries within a name system, or associate one or more entries from one name system with one or more entries from a second name system. For example, the Credits Name System described above could include matching instructions to match the "Actor" entry with the "Role" entry:

| Credits Name System (ID # 1) | | |
| --- | --- | --- |
| Entry | Entry ID # | Matching Instructions |
| "Actor" | 10 | Use Credits Name System, Entry 13 |
| "Director" | 11 | |
| "Producer" | 12 | |
| "Role" | 13 | |

If the following two name descriptors are transmitted:
(1) "Harrison Ford" [Name System Object ID for "Credits" name system, Entry ID for "Actor"]
(2) "Indiana Jones" [Name System Object ID for "Credits" name system, Entry ID for "Role"]

Receiver 64 will note the matching instructions when it accesses the Credits Name System Table, and will automatically match the two data elements and display "Indiana Jones: Harrison Ford".

Receipt and Processing of Program Guide Data

Figure 3:
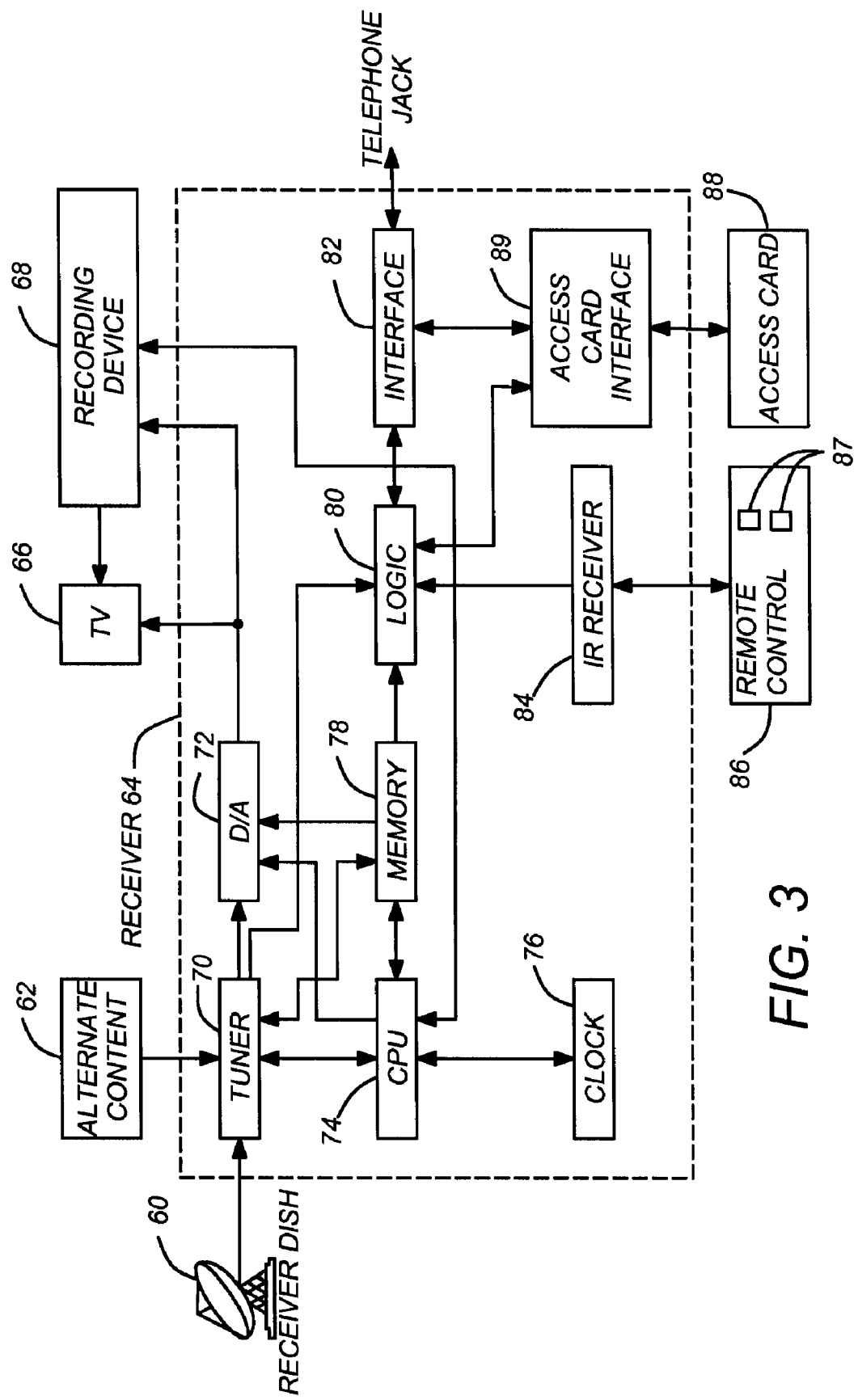
FIG. 3 is a block diagram of a receiver station for receiving and decoding audio, video and data signals.

FIG. 3 is a block diagram of one of receiver stations 34, which receives and decodes audio, video and data signals. Receiver station 34 includes receiver dish 60, alternate content source 62, receiver 64, television 66, recording device 68 and remote control 86. Receiver 64 includes tuner 70, digital-to-analog (D/A) converter 72, CPU 74, clock 76, memory 78, logic circuit 80, interface 82, and infrared (IR) receiver 84.

Receiver dish 60 receives signals sent by satellite 32, amplifies the signals and passes the signals on to tuner 70. Tuner 70 operates under control of CPU 74. Tuner 70 is preferably two separate tuners; a first tuner for tuning to digital DSAT and ATSC channels, and a second tuner for tuning to analog NTSC channels. The functions performed by CPU 74 are controlled by a control program stored in memory 78. Memory 78 also stores a parameter table, which includes a variety of parameters for receiver 64 such as a list of channels receiver 64 is authorized to process and generate displays for, the zip code and area code for the area in which receiver 64 is used, and the model number of receiver 64. Access card 88 is removable from receiver 64 (as shown in FIG. 3). When inserted into receiver 64, access card 88 is coupled to access card interface 89, which communicates via interface 82 to a customer service center (not pictured). Access card 88 receives access authorization information from the customer service center based on a user's particular account information. In addition, access card 88 and the customer service center communicate regarding billing and ordering of services. Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data in the packet (e.g., audio data, video data, or program guide data). Tuner 70 includes multiple output lines for transmitting video data, audio data and program guide data. As packets are received from receiver dish 60, tuner 70 identifies the type of each packet and outputs each packet on the appropriate output line, as discussed in more detail below. If tuner 70 identifies a packet as program guide data, tuner 70 outputs the packet to memory 78. Program guide data is stored in a guide database in memory 78.

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off-the-air NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other program guide objects can be found. The information from the boot object is used by tuner 70 to identify packets of program guide data and route them to memory 78.

As program guide data are received and stored in memory 78, CPU 74 performs various operations on the data in preparation for displaying a program guide on television 66. These operations include packet assembly, object assembly and object processing.

The first operation performed on the program guide data stored in memory 78 is packet assembly. During the packet assembly operation, CPU 74 examines the stored program guide data and determines the locations of the packet boundaries.

The next step performed by CPU 74 is object assembly. During the object assembly step, CPU 74 combines packets to create object frames, and then combines the object frames to create program guide objects. CPU 74 examines the checksum transmitted within each object frame, and verifies whether the frame data was accurately received. If the object frame was not accurately received, it is discarded from memory 78. Also during the object assembly step, receiver 64 discards assembled objects that are of an object type that receiver 64 does not recognize. Receiver 64 maintains a list of known object types in memory 78. CPU 74 examines the object header of each received object to determine the object type. CPU 74 compares the object type of each received object to the list of known object types stored in memory 78. If the object type of an object is not found in the list of known object types, the object is discarded from memory 78.

The last step performed by CPU 74 on received program guide data is object processing. During the object processing step, the objects stored in the guide database are combined to create a digital image of a program guide. The digital image of the program guide is later converted to an analog signal that is sent to television 66 for display to a user. Hence, the CPU 74 and associated components operate as a display generator. Television 66 may alternatively be a digital television, in which case no digital to analog conversion is necessary.

When a user requests the display of a program guide by pressing the "guide" button 87 on remote control 86, a guide request signal is received by IR receiver 84 (shown in FIG. 3) and transmitted to logic circuit 80. Logic circuit 80 informs CPU 74 of the guide request. In response to the guide request, CPU 74 causes memory 78 to transfer the program guide digital image to D/A converter 72. D/A converter 72 converts the program guide digital image into a standard analog television signal, which is then transmitted to television 66. Television 66 then displays the program guide.

Users interact with the electronic program guide using remote control 86. Examples of user interactions include selecting a particular channel or requesting additional guide information. Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. When a user selects a channel using remote control 86, IR receiver 84 relays the user's selection to logic circuit 80, which then passes the selection on to memory 78 where it is accessed by CPU 74. CPU 74 instructs tuner 70 to output the audio and video packets for the selected channel to D/A converter 72. D/A converter 72 performs an MPEG2 decoding step on received packets, converts the packets to analog signals, and outputs the analog signals to television 66.

User Identification

Figure 4:
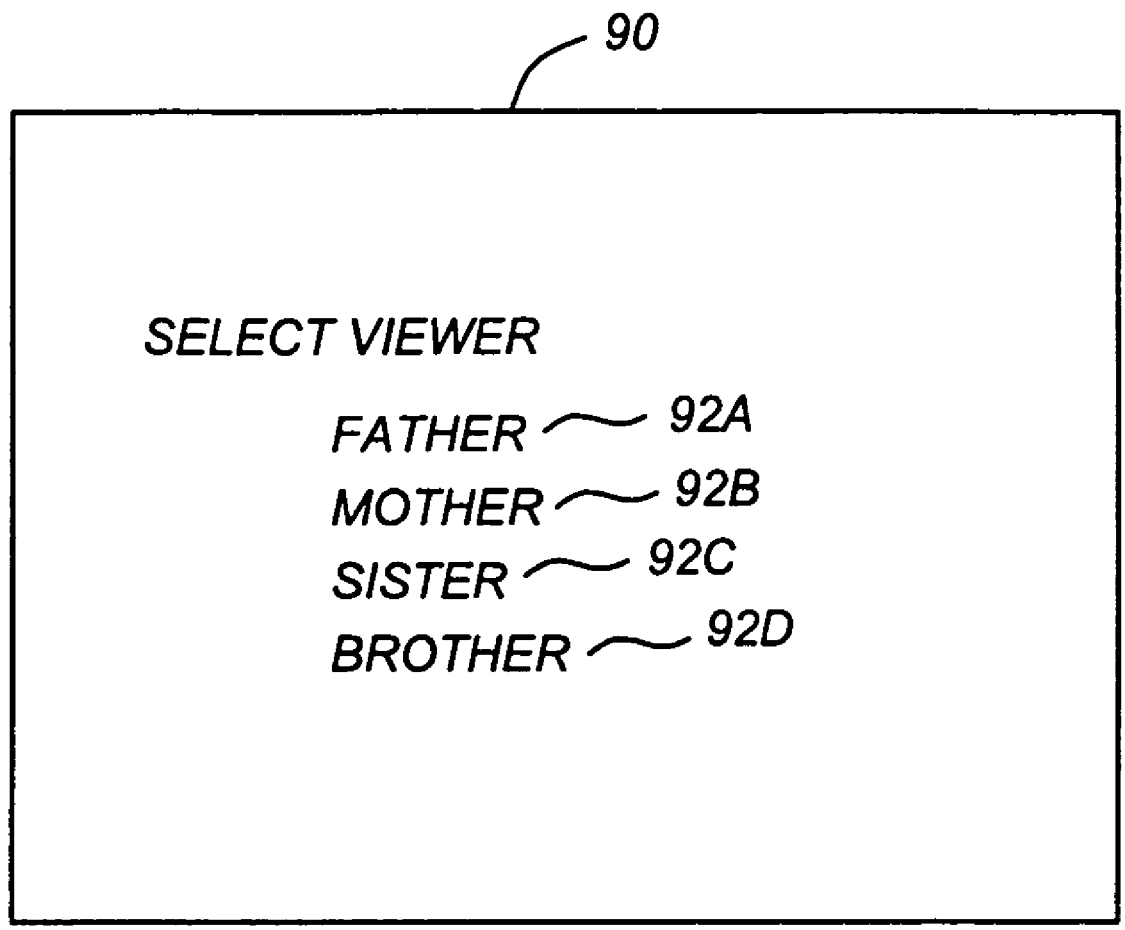
FIG. 4 shows a screen for entering viewer identification data.

When receiver 64 is first turned on, or after receiver 64 has not been interacted with for a predetermined time, receiver 64 preferably prompts the user to identify himself or herself. FIG. 4 shows identification screen 90 which is one example of a screen receiver 64 displays to prompt the user's identification. The identification screen displays a set of descriptions 92A-92D which enable the user to correctly identify himself or herself. Although FIG. 4 shows descriptions 92A-92D as being traditional family roles, descriptions can be identification numbers, names, initials, or other identifying information. The user highlights and enters one of descriptions 92A-92D using remote control 86, thereby identifying himself or herself.

When a user enters one of descriptions 92A-92D with remote control 86, a user identification signal is sent to receiver 64. Receiver 64 receives the user identification signal, identifies the user and stores attributes associated with that user's channel and program selections in a user-specific sub-history within a selection history table stored in memory 78. Attributes include information such as category descriptors that identify the type and category of program, credits information that identify the names and roles of those involved in the production of the program, and key words and phrases in the description of the program. Attributes also include indicators that the program is one of a particular series or that the program is one of a group of associated programs. For example, each episode of Star Trek, The Next Generation will have the same series indicator. The Star Trek movies, and various Star Trek series will all have the same group indicator, even if they are not part of one particular series.

The selection history table is initially empty when receiver 64 is first purchased. Each time a user makes a program selection, CPU 74 adds the attributes for the selected program to the selection history table and links the attributes to the current user. In compiling a selection history table, receiver 64 preferably filters out programs the user has selected, but viewed for an insignificant time period. CPU 74 of receiver 64 preferably keeps track of the amount of time each program is watched using clock 76 and stores the times in the selection history table. If programs and channels are watched for a time more than a set threshold, 12 hours for example, the attributes for those channels and programs are not stored in the selection history table. If programs are watched for a time that is less than a set threshold, such as 30 seconds, the attributes for those programs are not stored in the selection history table. In this way, programs the user selects when "channel surfing", or programs displayed when the user has forgotten to turn off the receiver are filtered out of the selection history table stored in memory 78.

Electronic Program Guide with Calendar Tool

Figure 5:
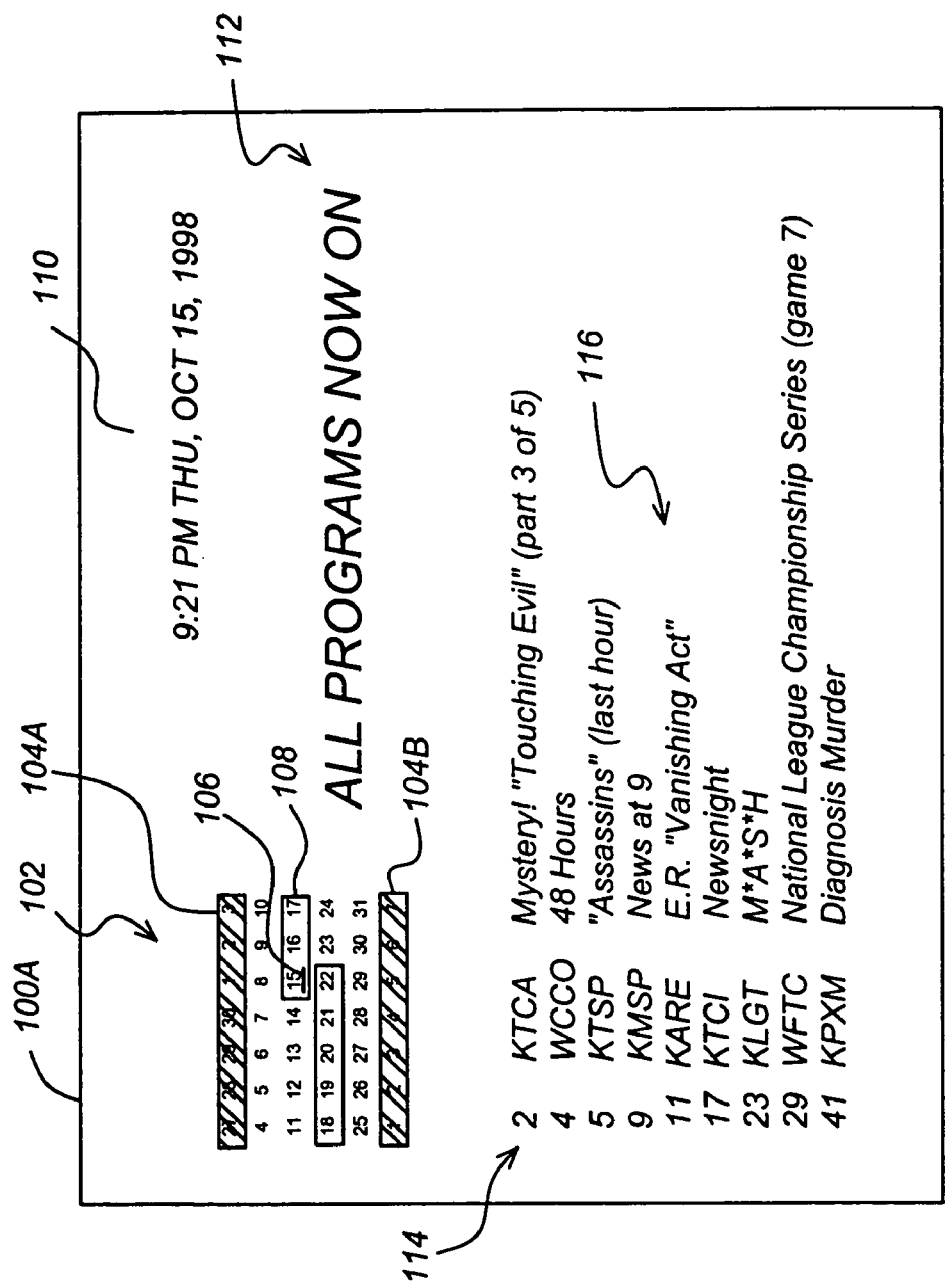

FIG. 5 shows program guide screen 100A, which is displayed on television 66. The program guide of the present invention may alternatively be displayed on other types of display devices, such as on a liquid crystal display (LCD) panel. When a user presses the "guide" button on remote control 86, program guide screen 100A is displayed to a user. Program guide screen 100A includes a calendar image 102, date and time indicator 110, guide title 112, channel list 114, and program list 116 having program representations separate from and adjacent to the calendar image 102. Calendar 102 includes masks 104A-104B, highlight bar 106, and data range indicator 108. Using arrow keys on remote control 86 to move a highlight bar through program list 116, a user is able to highlight and then select a particular program for viewing or to obtain additional information.

Masks 104A and 104B are overlaid on calendar dates other than those of the current month, thereby highlighting the current month. Data range indicator 108, which is shown as a light gray bar over the dates October 15-22 in calendar 102, provides an indication of the days for which program guide data is stored in receiver 64. Data range indicator 108 may be another color other than gray, or may appear in a different form such as a pair of brackets.

Highlight bar 106 appears as a narrow, black cursor located near the bottom of the fifteenth day on calendar 102. Highlight bar 106 acts as a selection indicator that indicates a date and time selection made by a user. Users control highlight bar 106 with arrow keys on remote control 86, and are able to move highlight bar 106 to different dates within calendar 102, and also up and down within particular dates. The highlight bar 106 shown in FIG. 5 is currently located near the bottom of the fifteenth day of the month, which corresponds to "9:21 pm" as shown by date and time region with an indicator 110 in a date and/or time region of the program guide screen 100A. The date and time indicator presents a representation of the date and time of day. If a user uses arrow keys on remote control 86 to move highlight bar 106 upwards within a particular date, the time shown in date and time indicator 110 moves backward in time. Similarly, if a user moves highlight bar 106 downward within a particular date of calendar 102, the time shown in date and time indicator 110 moves forward. Likewise, if a user moves highlight bar 106 to a different date within calendar 102, the date shown in date and time indicator 110 changes to the date selected by highlight bar 106.

Channel list 114 includes a list of channel names or channel numbers, or both. Channel list 114 may also include icons, such as icons that represent particular channels. Program list 116 includes a list of media programs (which may include a combination of television programs, audio programs, and other multimedia programs) that correspond to the channels listed in channel list 114 and to the date and time indicated by date and time indicator 110. As shown in FIG. 5, the date and time selected by highlight bar 106 is the current date and time, which is displayed as "9:21 pm Thu, Oct. 15, 1998". The guide title 112 in the guide title region indicates that the television programs listed in program list 116 are currently being broadcast by the phrase "Now On". Whenever highlight bar 106 is moved from the current date and time, the date and time shown in date and time indicator 110 is correspondingly changed, and the guide title 112 is also changed. These changes are illustrated in FIGS. 6 and 7.

Figure 6:
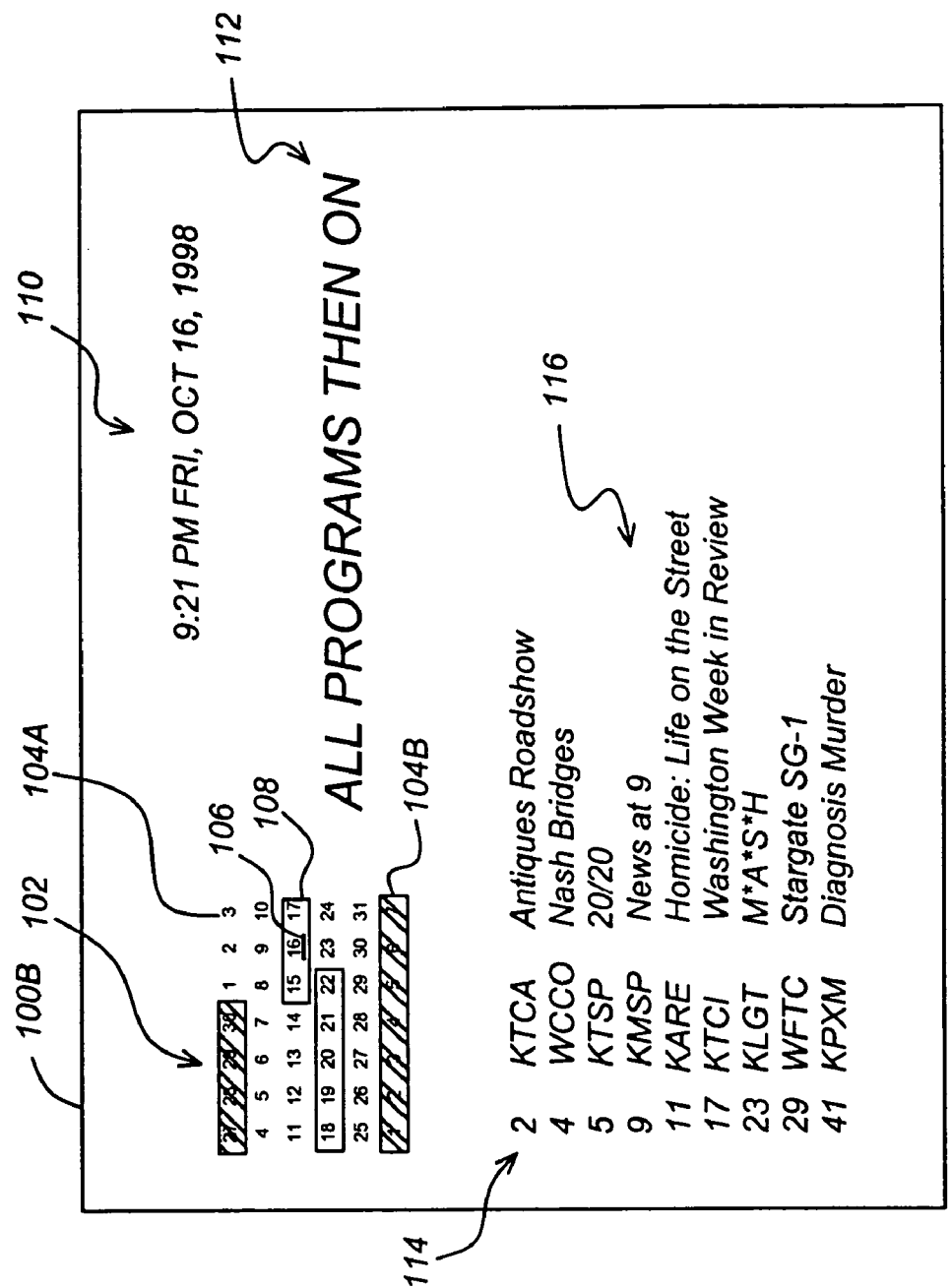
FIG. 6 shows a preferred embodiment of a program guide with a calendar tool, which is displayed after a user has navigated to a different date than that shown in FIG. 5.

FIG. 6 shows program guide screen 100B. As shown in FIG. 6, highlight bar 106 has been moved to the right from the fifteenth of the month (FIG. 5) to the sixteenth of the month. When highlight bar 106 is moved to the sixteenth of the month, the date shown in date and time indicator 110 is also changed to the sixteenth of the month. However, since highlight bar 106 was moved directly to the right and not up and down, the time shown in date and time indicator 110 remains the same as that shown in FIG. 5. The list of programs in program list 116 also changes to correspond to the new date shown in date and time indicator 110. Therefore, the television programs shown in program list 116 of FIG. 6 are programs that will be broadcast on Oct. 16, 1998 at 9:21 p.m. Whenever highlight bar 106 is moved from the current date and time, guide title 112 is changed to "All Programs Then On" to indicate that the programs listed in program list 116 are not programs that are currently being broadcast, but are programs that will be broadcast at the date and time indicated by date and time indicator 110. The title region thus presents a categorical (e.g. "All Programs Then On" and "All Programs Now On") description of the listing of programs in the program list 116.

Figure 7:
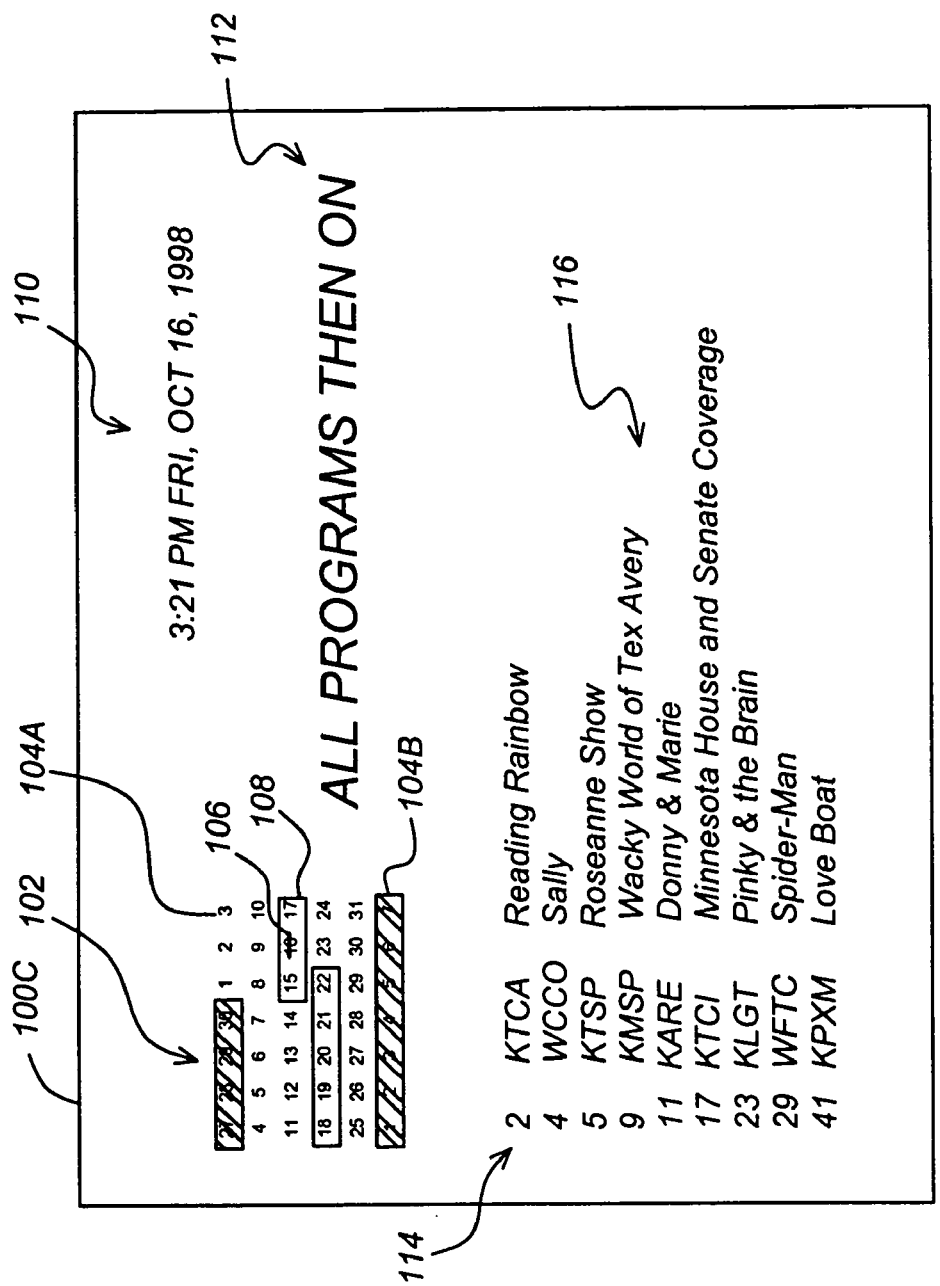
FIG. 7 shows a preferred embodiment of a program guide with a calendar tool, which is displayed after a user has navigated to a different time than that shown in FIG. 6.

FIG. 7 shows program guide screen 100C which is similar to program guide screen 100B shown in FIG. 6, but highlight bar 106 has been moved upward within the sixteenth of the month of calendar 102. Highlight bar 106 has been moved upward a distance corresponding to six hours in time. Therefore, the time shown in date and time indicator 110 is six hours earlier than the time shown in FIG. 6, but the date, Oct. 16, 1998, is the same. When highlight bar 106 is moved upward, the television programs shown in program list 116 also change. The programs shown in program list 116 of FIG. 7 are those programs that will be broadcast at 3:21 p.m. on Oct. 16, 1998.

Figure 8:
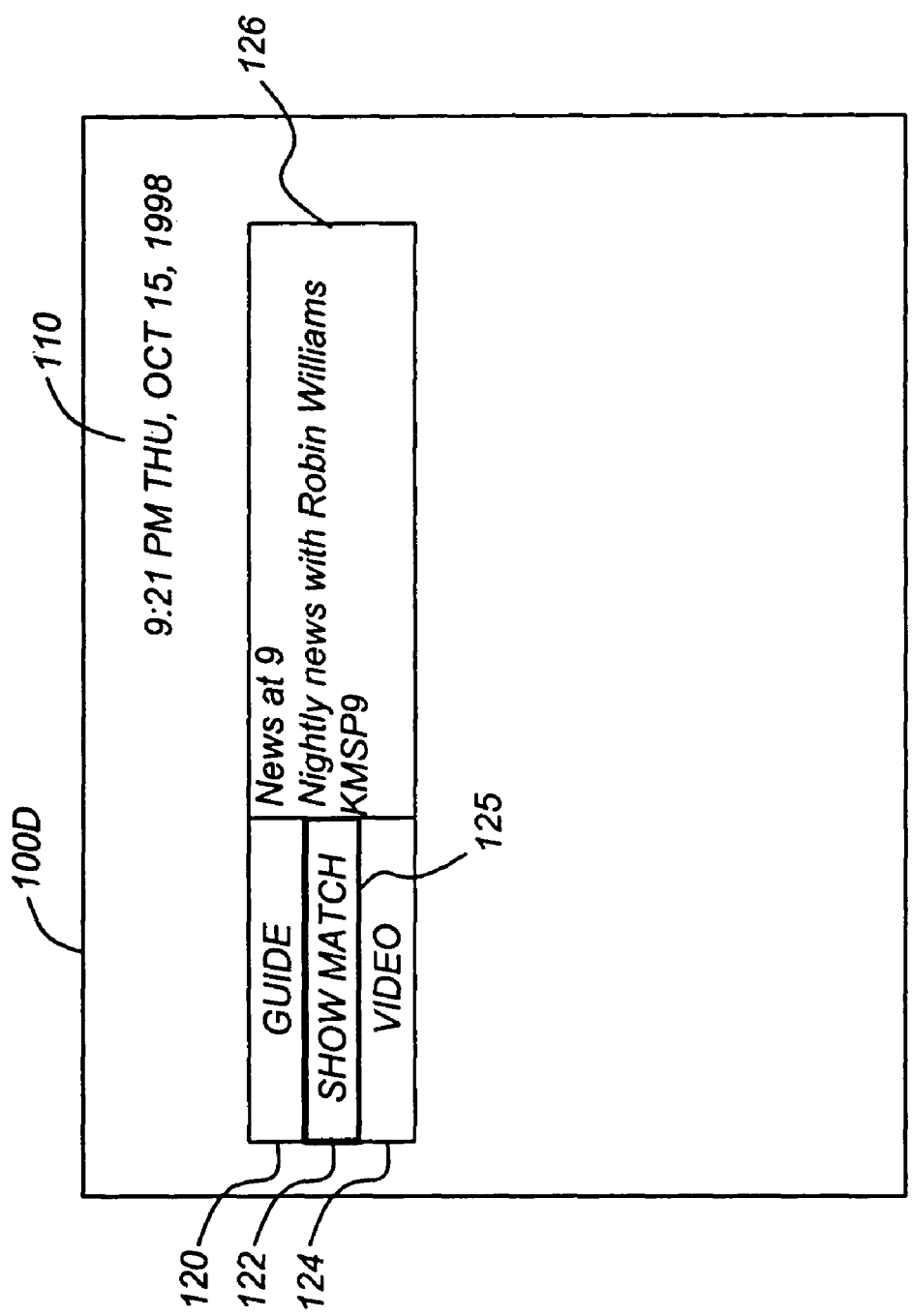
FIG. 8 shows a follow-on screen that is displayed after a user makes a program selection from the program guide shown in FIG. 5.

FIG. 8 shows program guide screen 100D, which includes date and time indicator 110, "guide" option 120, "show match" option 122, "video" option 124, highlight box 125 and information window 126. Program guide screen 100D is displayed to a user when the user highlights the program "News at 9" on channel "9 KMSP" from program guide screen 100A (shown in FIG. 5), and presses the "Info" button on remote control 86. Additional information about the selected program is provided in information window 126. Again using arrow keys on the remote control, a user moves highlight box 125 over "guide" option 120, "show match" option 122 or "video" option 124 and presses the "enter" key on remote control 86 to select the highlighted option. Choosing "guide" option 120 brings the user back to program guide screen 100A (shown in FIG. 5), which displays all programs currently being broadcast. Choosing "show match" option 122 causes program guide screen 100E, shown in FIG. 9, to be displayed to the user. Choosing "video" option 124 causes the video for the selected program (in this case, "News at 9") to be displayed on the television 66.

Figure 9:
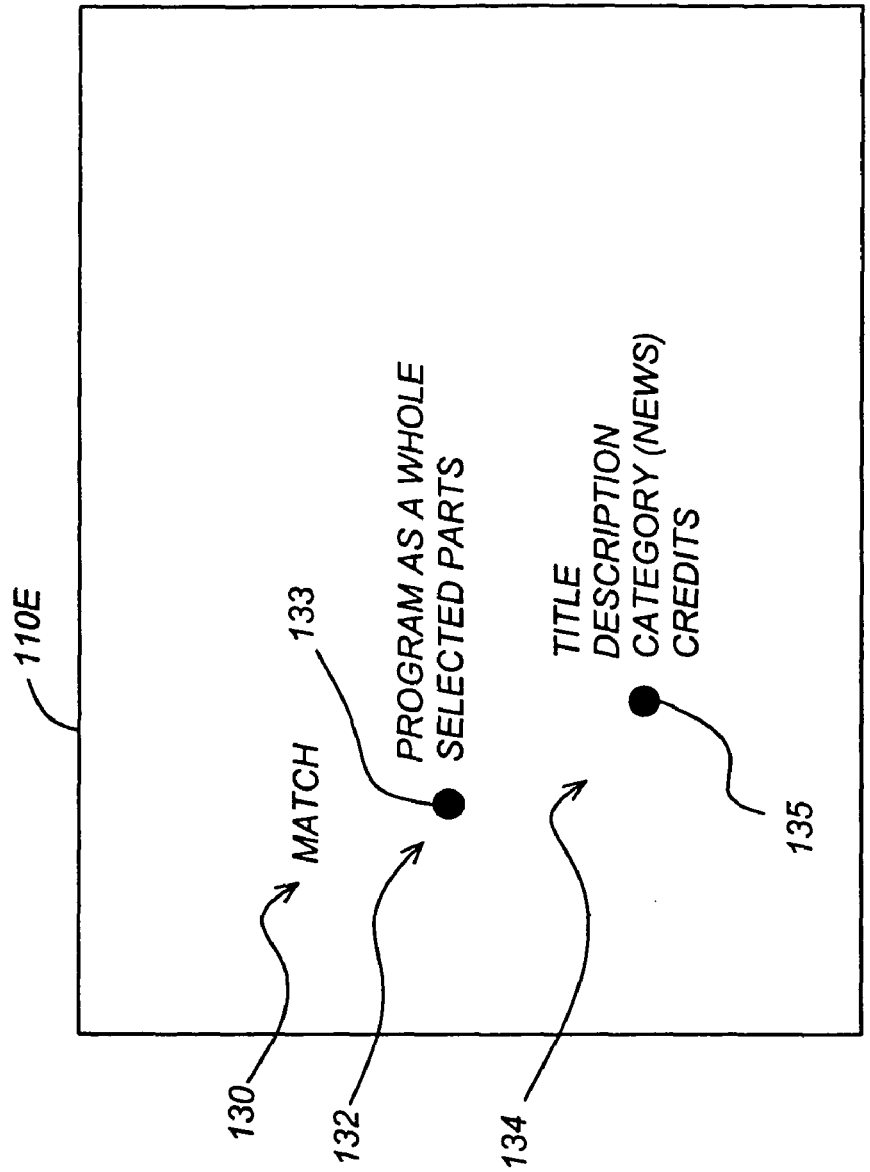
FIG. 9 shows a follow-on screen that is displayed after a user selects the "show match" option from the screen shown in FIG. 8.

After choosing the "show match" option 122 from program guide screen 100D, program guide screen 100E shown in FIG. 9 is displayed. Choosing the "show match" option 122 allows a user to find additional television programs that are related to the selected program. Program guide screen 100E includes title 130, match options 132, program parts 134 and selection indicators 133 and 135. A user moves selection indicator 133 next to either "Program as a Whole" or "Selected Parts" using the up and down arrow keys on remote control 86, and then presses the "enter" key to select that option.

When a user selects "Program as a Whole" from match options 132, CPU 74 examines the program guide data stored in memory 78 and identifies programs that match any portion of the selected program (i.e., "News at 9"). For instance, CPU 74 will identify and display programs that have a similar title, program description, category or credits. Alternatively, the user may choose to perform a more focused search by choosing the "Selected Parts" option from match options 132. After choosing "Selected Parts", the user presses the up and down arrow keys on remote control 86 to move selection indicator 135 and select one of the four listed program parts 134. Selecting "title" allows the user to find other programs that have the same title as the previously selected program. Selecting the "description" option allows the user to find programs that have similar descriptions to the description of the previously selected program. Selecting the "category" option allows the user to find programs that fall under the same category as the previously selected program, which in this case is "News". CPU 74 identifies the general category for the currently selected program and displays it in parentheses next to the "category" option. Lastly, selecting the "credits" option allows the user to find programs that include credits similar to the credits of the previously selected program, such as the same actors, same directors, etc.

Figure 10:
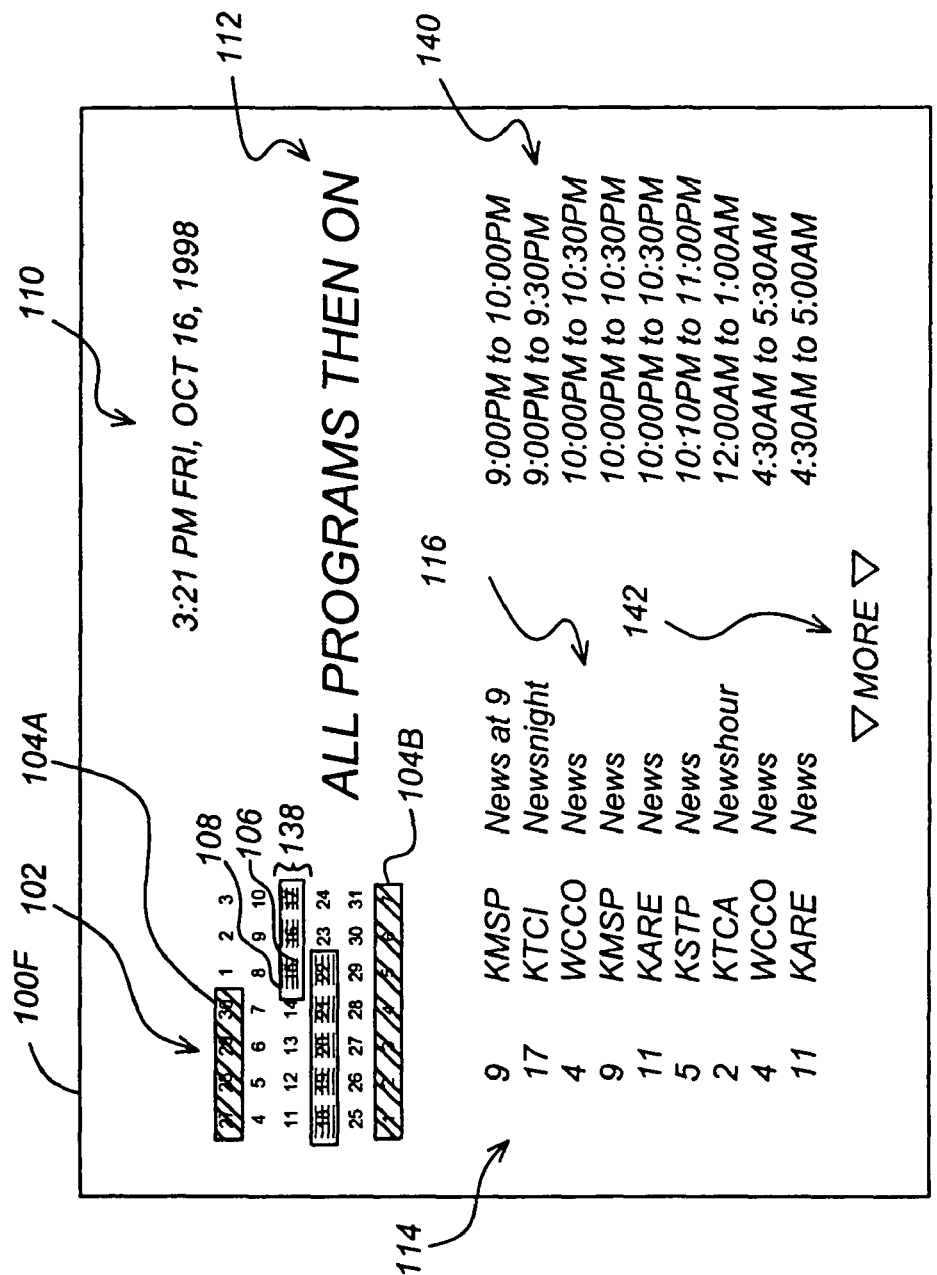
FIG. 10 shows a preferred embodiment of a program guide with a calendar tool that includes multiple program indicators.

FIG. 10 shows program guide screen 100F, which is shown after a user selects the option "Category (News)" from program parts 134 shown in FIG. 9. Selection of "Category (News)" indicates that the user wants to see only those programs that have "news" as a category. CPU 74 identifies all of the news programs in the stored program guide data, lists them in program list 116 and changes guide title 112 to the categorical classification of "All News Programs". Program guide screen 100F also shows in time list 140 the time ranges for each of the television programs in program list 116. "More" indicator 142 provides an indication that additional news programs are available and may be listed by scrolling downward.

Calendar 102 in FIG. 10 provides a general indication of the concentration of news programs at various points in time. Data range indicator 108 of calendar 102 includes multiple program indicators 138, which in this embodiment appear as small, dark horizontal lines across each of the dates within the data range indicator 108. Each program indicator 138 corresponds to one of the programs listed in program list 116. Therefore, the more programs indicators 138 listed on a particular date within calendar 102, the more news programs being broadcast on that date. The program indicators 138 within calendar 102 are more clearly visible in FIG. 11, and are discussed in more detail with respect to that Figure.

Figure 11:
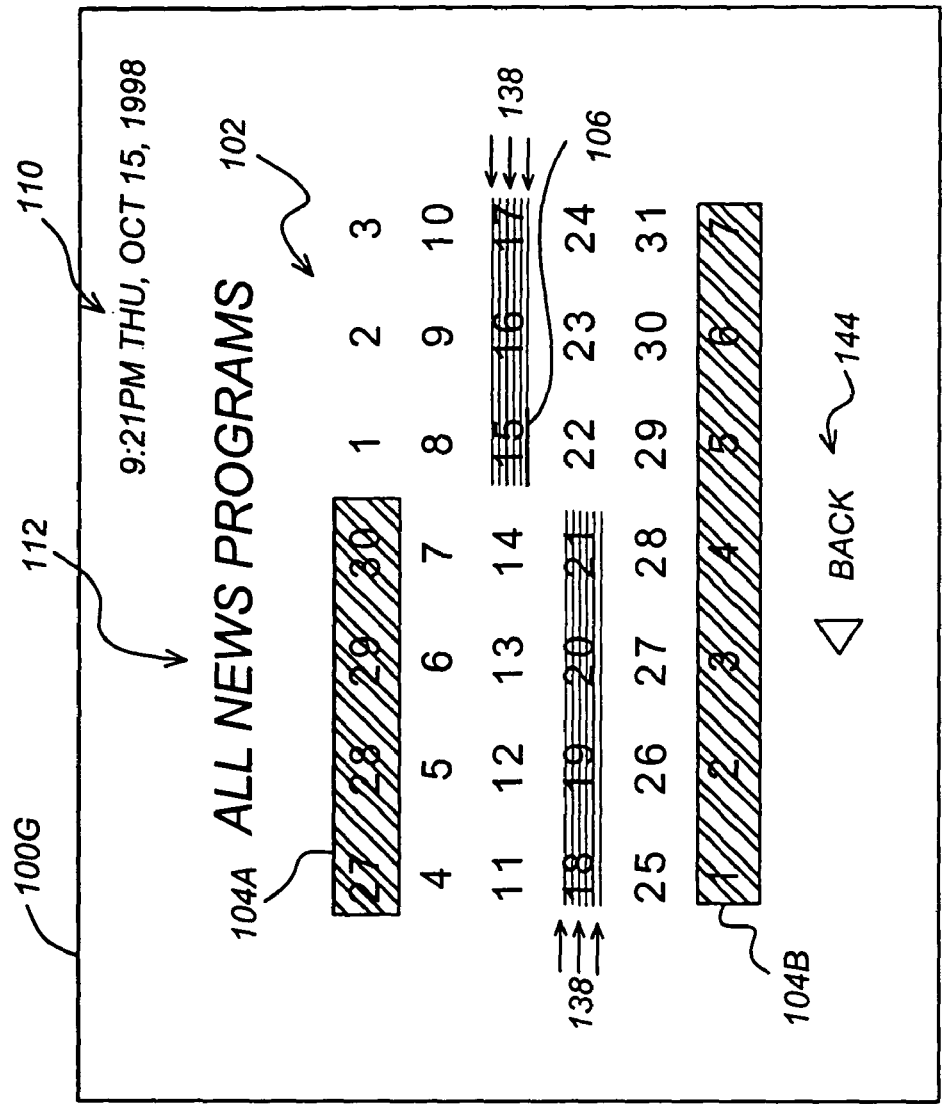
FIG. 11 shows an expanded view of the calendar shown in FIG. 10.

FIG. 11 shows program guide screen 100G. Program guide screen 100G includes an expanded view of calendar 102 shown in FIG. 10. Program guide screen 100G is shown when a user highlights calendar 102 in screen 100F and presses a "maximize" button on remote control 86. Program guide screen 100G includes guide title 112, date and time indicator 110, calendar 102 and "back" indicator 144. Using the arrow keys on remote control 86, a user can navigate to "back" indicator 144. Selection of "back" indicator 144 causes the previously displayed screen to be shown, which is screen 100F (shown in FIG. 10).

Calendar 102 includes masks 104A and 104B, highlight bar 106 and program indicators 138. Program indicators 138 are overlaid on various dates within calendar 102 and represent one or more television programs. In this case, each program indicator 138 overlaid on a particular date of calendar 102 indicates that at least one news program is scheduled to be broadcast on that date, at a time corresponding to the position of the program indicator 138. Program indicators 138 that are located near the top of a particular date correspond to times earlier in the day, while program indicators located toward the bottom of a particular date correspond to times later in the day. The program indicators 138 are preferably darker for a higher concentration of programs at a particular date and time, and are lighter if there are only one or a few programs at a particular date and time.

Some types of programs, like news programs, are broadcast every day, and at all times during the day (e.g., CNN continuously broadcasts news programs throughout the day). For these types of programs, program indicators 138 may appear as a continuous block that extends from the top of each date to the bottom, rather than appearing as discrete indicators. In certain areas within a particular date, the concentration of news programs increases as additional news channels broadcast news programs. For example the concentration of news programs increases between 4 and 6 p.m., and between 9 and 11 p.m., so the program indicators 138 corresponding to these times are darker. Rather than using varying levels of gray, other techniques may be used to indicate the concentration of programs on particular dates within calendar 102. For example, varying colors may be used to indicate program concentrations.

Highlight bar 106 within calendar 102 acts as a selection indicator that indicates a date and time selection made by a user. Users control highlight bar 106 with arrow keys on remote control 86, and are able to move highlight bar 106 to different dates within calendar 102, and also up and down within particular dates to select a time of day. Highlight bar 106 is preferably darker, lighter, or a different color than program indicators 138 so that highlight bar 106 is easily identifiable. When calendar 102 is minimized as shown in FIG. 10, a user can move highlight bar 106 so that it is aligned with a program indicator 138. When highlight bar 106 is aligned with a program indicator 138, the television program or programs represented by that program indicator are listed in program list 116. In addition, the date and time shown by date and time indicator 110 are changed to correspond to the position of the highlight bar 106.

Figure 12:
FIG. 12 shows a screen for selecting a search technique.

The calendar of the present invention works well with a variety of searching techniques. As with the program matching technique described above, search results for other searching techniques are also conveyed by using program indicators 138 on calendar 102. FIG. 12 illustrates a few alternative searching techniques. FIG. 12 shows program guide screen 100H, which is displayed when a user presses the "find" button on remote control 86. Program guide screen 100H includes title 150 and search options 152A-152D.

Figure 13:
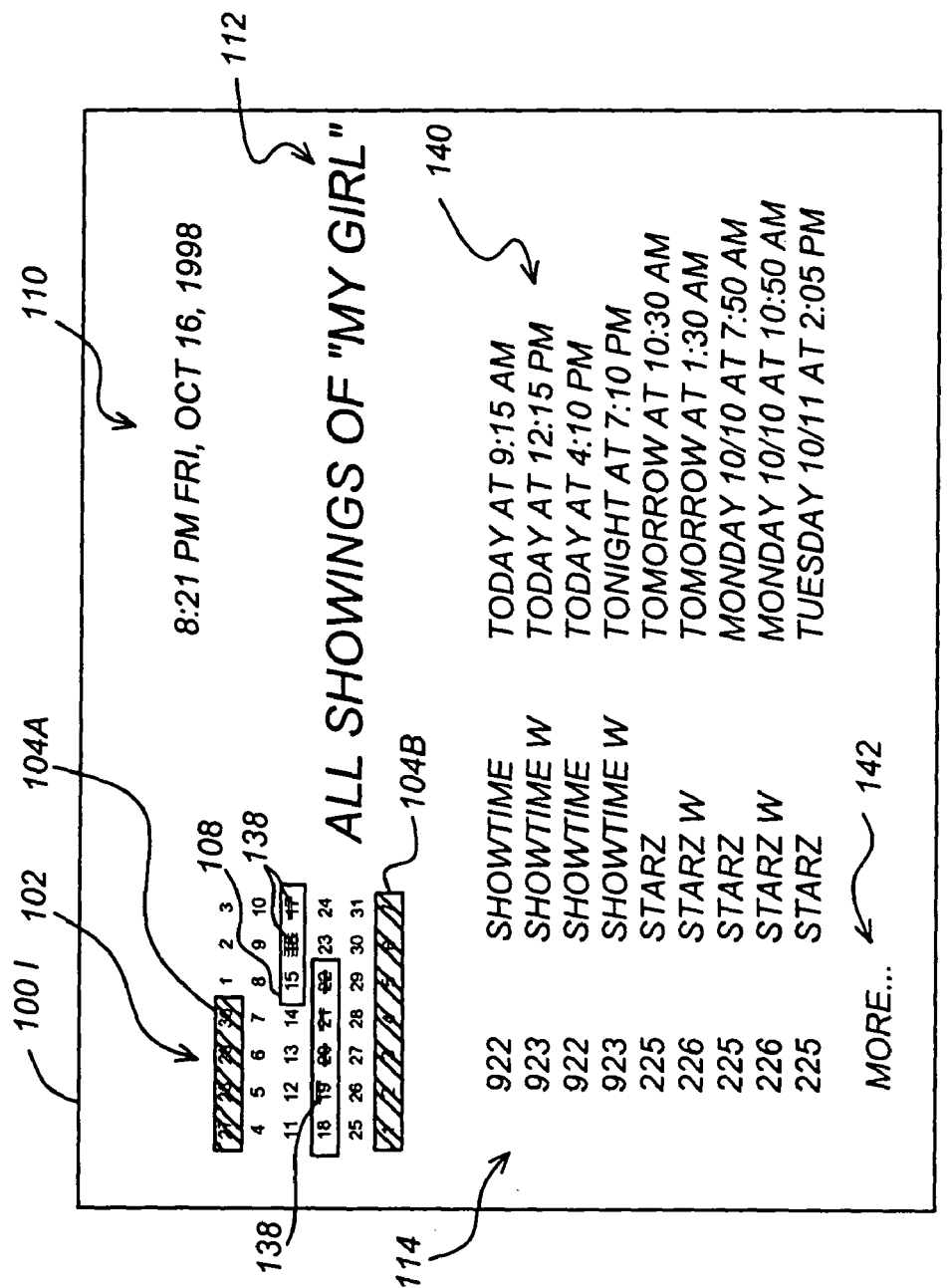
FIG. 13 shows a program guide with a calendar tool indicating dates and times of all showings of a selected program.

A user scrolls through the list of search options 152 using arrow keys on remote control 86. Selecting option 152A ("All showings of this program") causes receiver 64 to display the dates and times of all showings of the program currently being watched, or all showings of a program previously selected in the program guide. For example, FIG. 13 shows program guide screen 100I, which lists the dates and times for all showings of the program "My Girl" in time list 140. Receiver 64 also displays calendar 102 with multiple program indicators 138 overlaid on various dates. The program indicators 138 provide an indication of the dates and times of the various showings of the selected program. Receiver 64 identifies the dates and times of all showings by examining the most current version of the master schedule object and locating all occurrences of the general program object or objects for the selected program.

Figure 14:
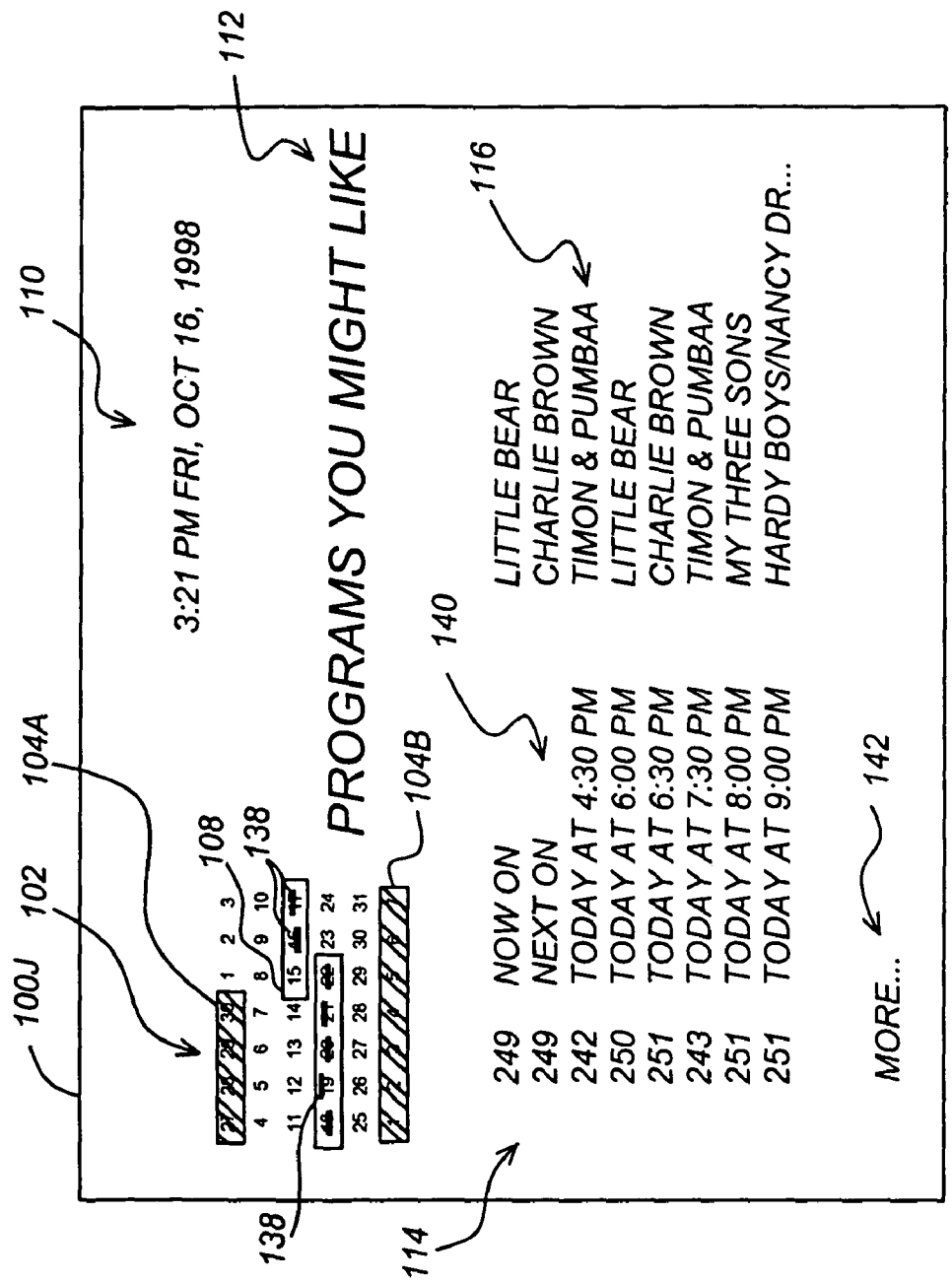

Selecting search option 152B ("Other programs I might like") from program guide screen 100H causes receiver 64 to display a screen that lists programs that might be of interest to the user, such as program guide screen 100J shown in FIG. 14.

In addition to listing program titles in program list 116 and broadcast times in time list 140, receiver 64 also generates a display of calendar 102 with multiple program indicators 138 overlaid on various dates. The program indicators 138 correspond to the dates and times listed in time list 140 and provide an indication of the dates and times of the various programs listed in program list 116. When a user selects search option 152B, receiver 64 reviews the selection history table for the current user and identifies favorite programs based on the most frequently appearing program attributes.

Figure 15:
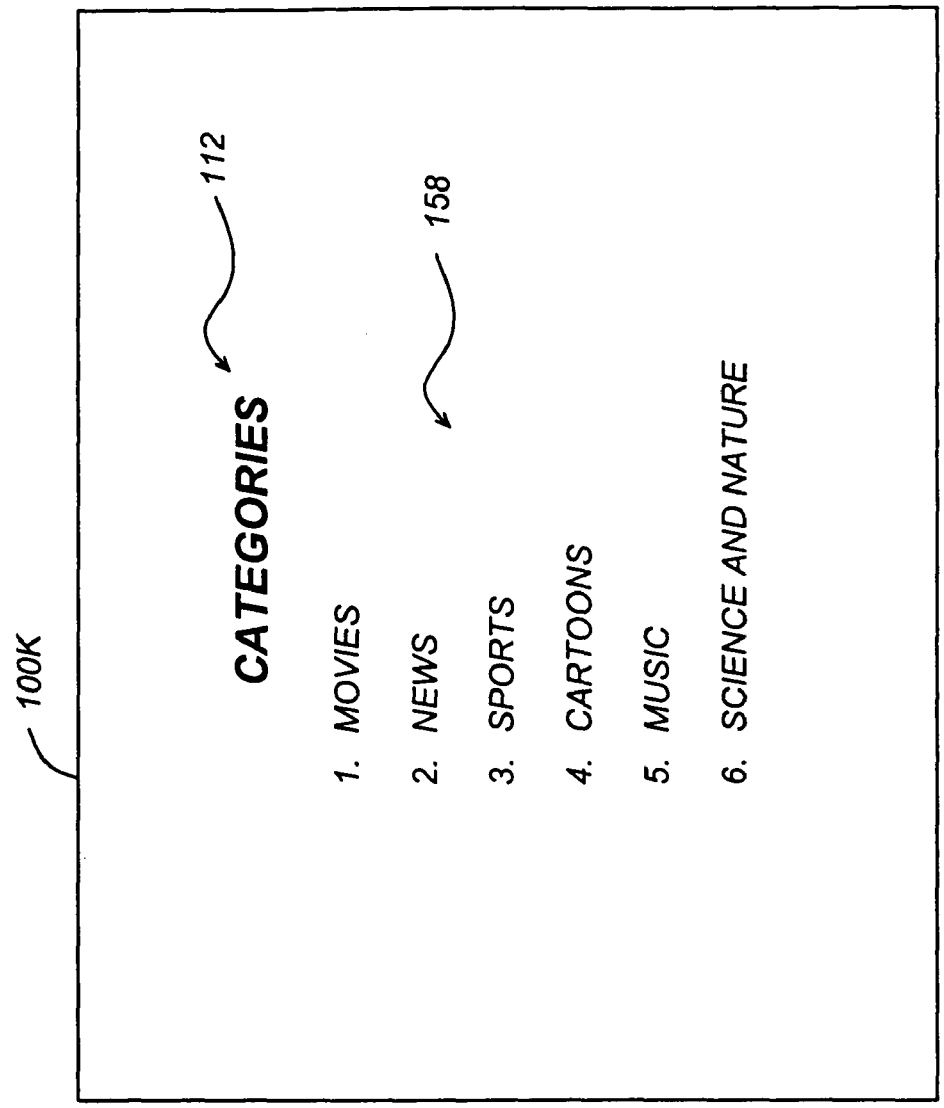
FIG. 15 shows a screen listing multiple categories.

Selecting search option 152C ("By category") from program guide screen 100H causes receiver 64 to display a list of categories 158 as shown in program guide screen 100K of FIG. 15. The user can then scroll through the list of categories 158 and select a desired category. When a user selects a desired category, receiver 64 displays a list of programs that fall under the selected category. FIG. 10 shows one example of a screen that lists programs falling under a particular category, which in that case is the category "News". Receiver 64 also displays calendar 102 with multiple program indicators 138 overlaid on various dates. The program indicators 138 provide an indication of the dates and times of the listed programs. Receiver 64 preferably selects the programs to display by examining category descriptors in all of the general program objects stored in memory 78, and identifying those program objects that have the same category descriptor as the category selected by the user.

Figure 16:
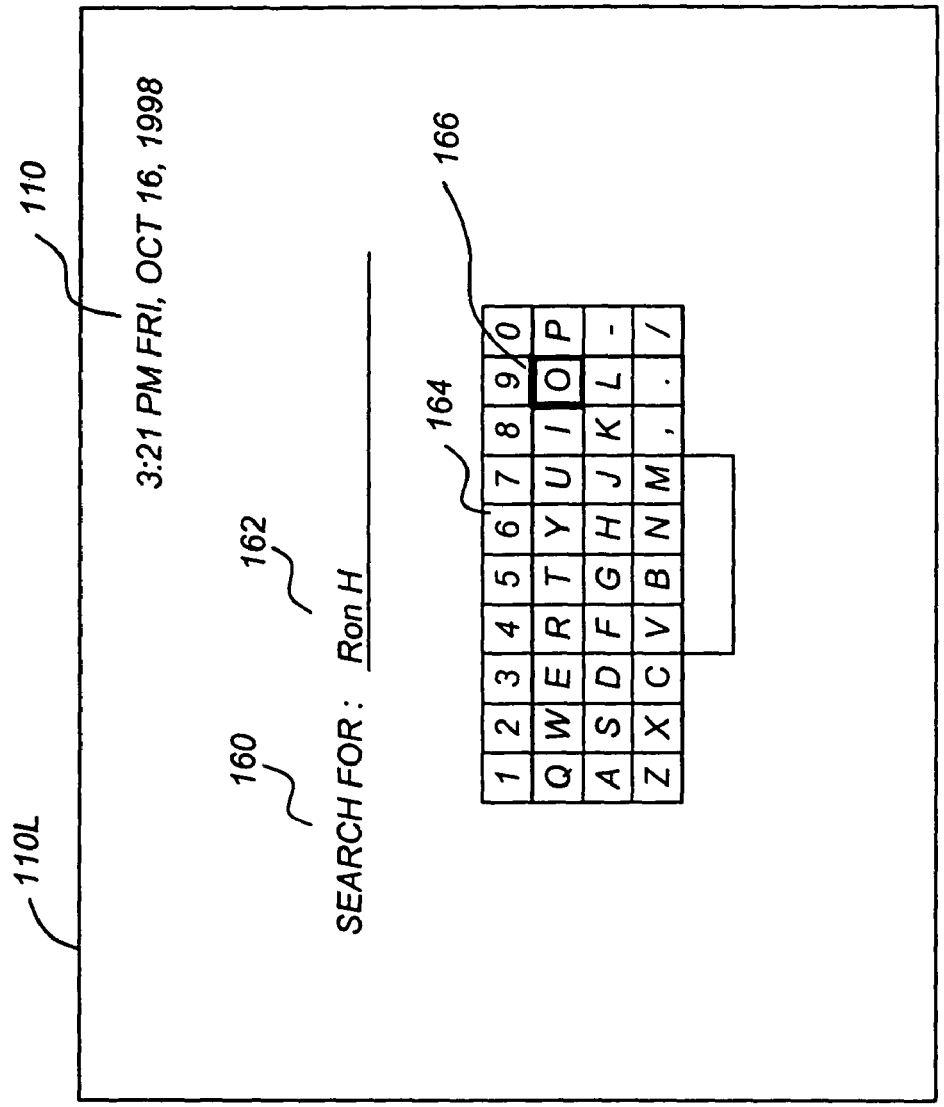
FIG. 16 shows a screen for entering a search request.
Figure 17:
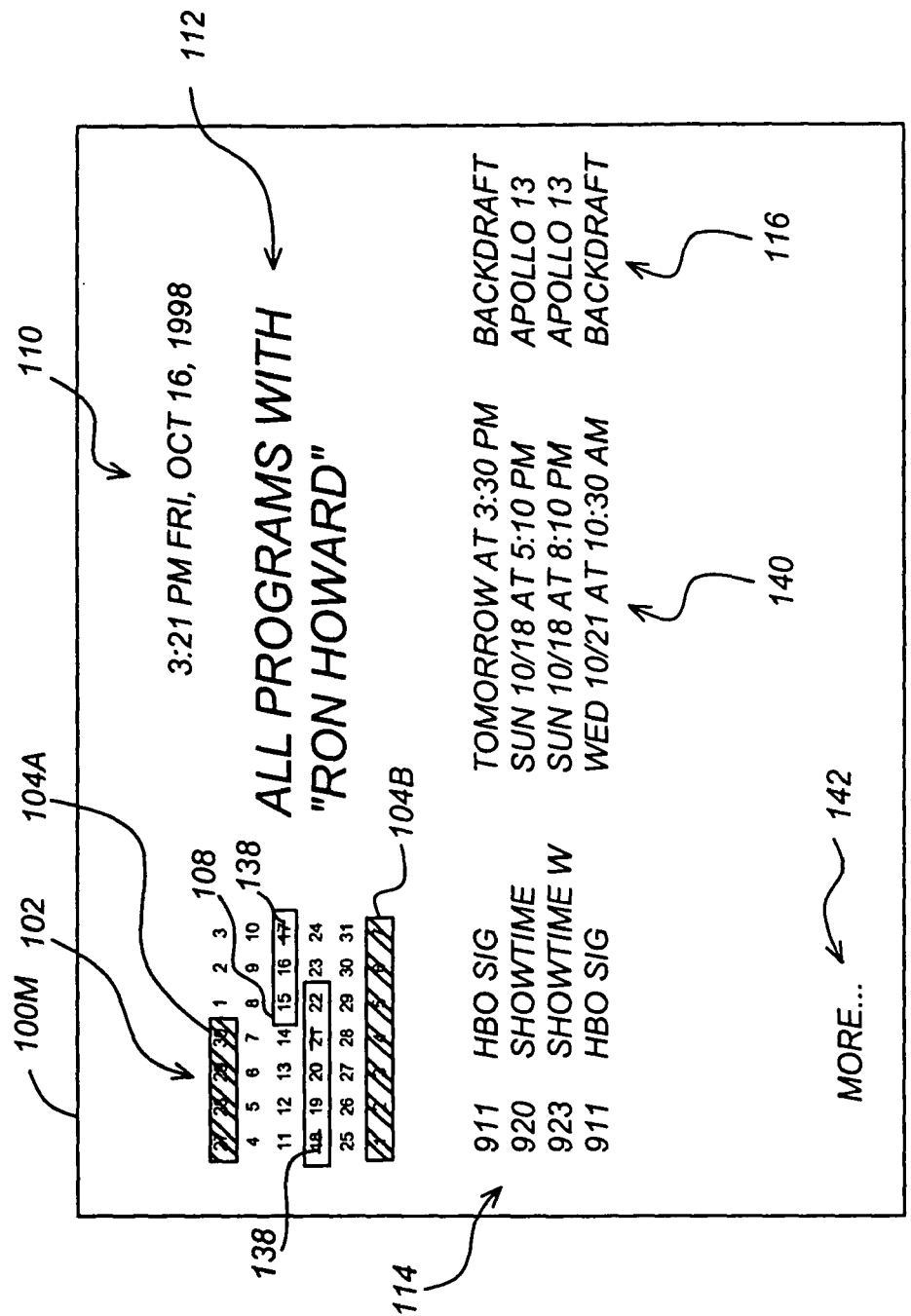
FIG. 17 shows a program guide with a calendar tool indicating dates and times of programs identified based on a search request.

Selecting search option 152D ("Interactive search") from program guide screen 100H causes receiver 64 to display program guide screen 100L as shown in FIG. 16. Program guide screen 100L includes search prompt 160, text entry region 162, keyboard image 164 and highlight box 166. Users can move highlight box 166 around keyboard image 164 using arrow keys on remote control 86 and enter text. Text selected by a user is shown in text entry region 162, where the text "Ron H" is displayed. After the desired text has been entered (in this case, the complete text would be "Ron Howard"), the user presses a "search" button on remote control 86 which causes receiver 64 to display a list of programs that include text that matches the text entered by the user. In this case, program guide screen 100M shown in FIG. 17 is displayed. Program guide screen 100M lists programs that Ron Howard participated in. Program guide screen 100M also includes calendar 102, which includes multiple program indicators 138 overlaid on various dates. The program indicators 138 provide an indication of the dates and times of the listed programs. Receiver 64 selects the list of programs to display by comparing the entered text to the program guide data stored in memory 78.

Figure 18:
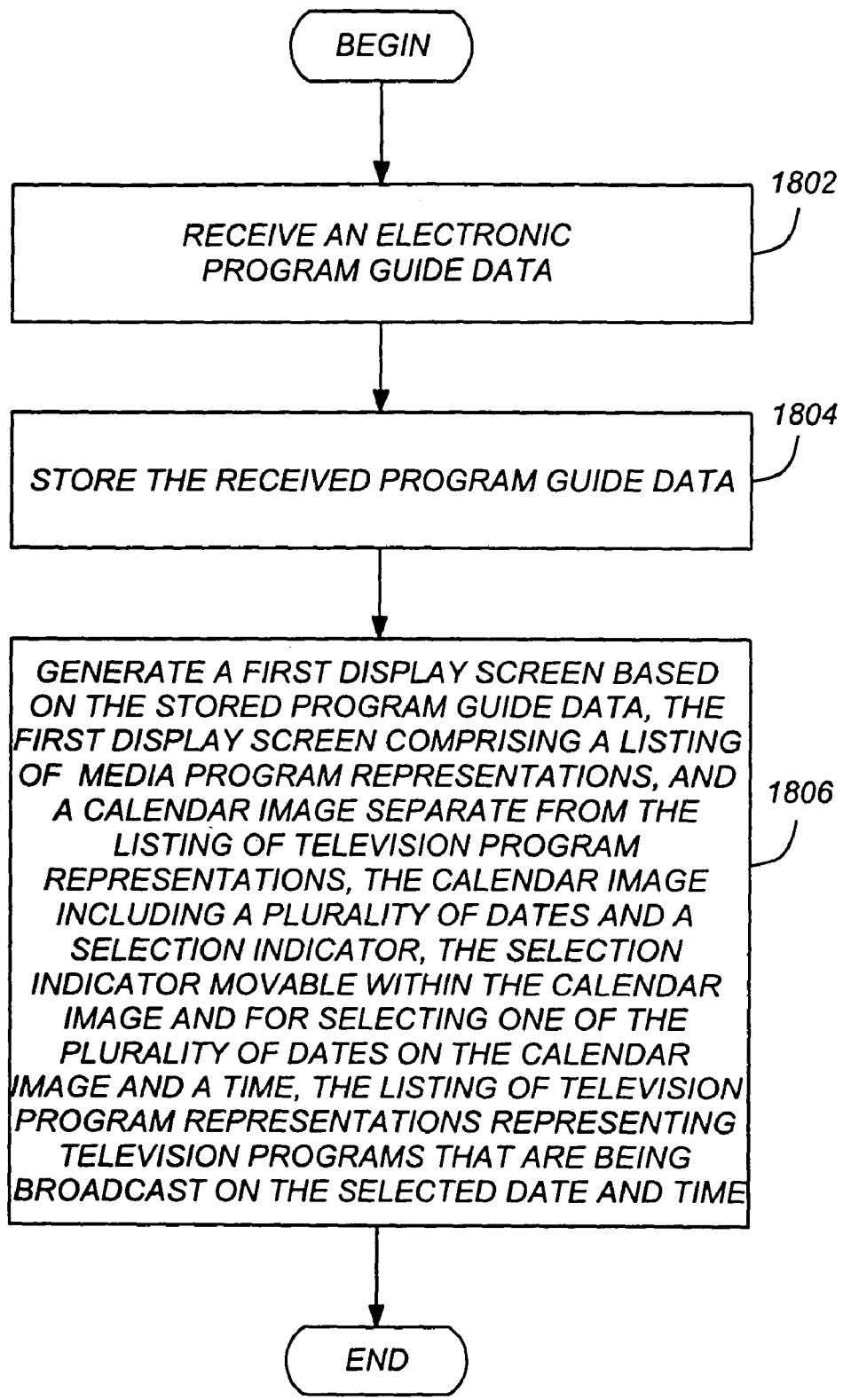
FIG. 18 is a flow chart presenting illustrative method steps that can be used to practice one embodiment of the present invention.

FIG. 18 is a flow chart presenting illustrative method steps that can be used to practice one embodiment of the present invention. Electronic program guide data is received, as shown in block 1802. As described above, the electronic program guide data is typically received along with media program content, but the electronic program guide data may be transmitted separate from the media program content, if desired. Program guide data is identified (if transmitted with media program content) and stored, as shown in block 1804. A first display screen is generated based on the stored program guide data, as shown in block 1806. The first display screen includes a listing of media program representations and a calendar image separate from the list of the media program representations. The calendar image includes a plurality of dates and a selection indicator that is movable within the calendar image, and is usable to select one of a plurality of dates on the calendar image. The listing of media program representations represents media programs that are being broadcast on the selected date. In one embodiment of the present invention, the selection indicator also selects a range of time within the date, and the listing of media programs is limited to programs that are scheduled to be broadcast in the range of time.

The above-described searching techniques are just a few of the many different possible methods of locating desired programs. Numerous other searching techniques may also be used in conjunction with the calendar tool of the present invention.

Although the present invention has been described with reference to preferred embodiments, workers skilled in the art will recognize that changes may be made in form and detail without departing from the spirit and scope of the invention.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An electronic program guide for providing information regarding a plurality of broadcast media programs comprising:
    a listing of media program representations that represent a first subset of the plurality of media programs, the first subset of media programs being obtained by a search of the plurality of broadcast media programs; and
    a calendar image displayed separate from and with the listing of media program representations, the calendar image including a plurality of dates and a plurality of program indicators, each program indicator being overlaid on one or more of the plurality of dates, thereby providing an indication of the dates on which only the first subset of media programs will be broadcast;
    wherein the calendar image includes a selection indicator, the selection indicator movable within the calendar image for selecting one of the plurality of dates on the calendar image.

2. The electronic program guide of claim 1, wherein the calendar image includes dates for an entire month.

3. The electronic program guide of claim 1, further comprising a date region separate from and adjacent to the calendar image, the date region including therein a representation of a calendar date that changes as the selection indicator is moved from date to date within the calendar image.

4. The electronic program guide of claim 1, further comprising a time region separate from and adjacent to the calendar image, the time region including therein a representation of a time of day that changes as the selection indicator is moved upward and downward within a particular date on the calendar image.

5. The electronic program guide of claim 1, further comprising a title region separate from and adjacent to the calendar image, the title region including therein a title or categorical description of the listing of media program representations, the title or categorical description changing when the selection indicator is moved from the current date and time within the calendar image.

6. The electronic program guide of claim 1, further comprising a data range indicator that provides an indication on the calendar image of the dates for which program guide information is available.

7. The electronic program guide of claim 1, further comprising a mask that is overlaid on certain dates within the calendar image, thereby highlighting other dates within the calendar image.

8. The electronic program guide of claim 1, wherein the calendar image is expandable by user command.

9. The electronic program guide of claim 1, wherein the program indicators appear in different shades to indicate different concentrations of media programs.

10. The electronic program guide of claim 1, wherein the program indicators appear in different colors to indicate different concentrations of media programs.

11. An electronic program guide receiving system that receives and generates a display of television content and program guide data, the system comprising:
a receiver for receiving the program guide data and the television content;
a memory for storing the received program guide data; and
a display generator for generating a first display screen based on the received program guide data, the first display screen comprising a listing of media program representations and a calendar image displayed separate from and with the listing of media program representations, the calendar image including a plurality of dates and a selection indicator, the selection indicator movable within the calendar image, the selection indicator for selecting one of the plurality of dates on the calendar image and a time, the listing of media program representations representing a plurality of media programs that are being broadcast on the selected date and time;
wherein the selection indicator is movable within dates on the calendar image to select a particular time, the listing of media program representations represents a first subset of the plurality of media programs obtained by a search of the plurality of the program guide data, and the calendar image further includes a plurality of program indicators, each program indicator being overlaid on one or more of the plurality of dates, thereby providing an indication of the dates on which only the first subset of the plurality of media programs will be broadcast.

12. The system of claim 11, wherein the calendar image includes dates for an entire month.

13. The system of claim 11, wherein the first display screen further comprises a date region separate from the calendar image, the date region including therein a representation of a calendar date that changes as the selection indicator is moved from date to date within the calendar image.

14. The system of claim 11, wherein the first display further comprises a time region separate from the calendar image, the time region including therein a representation of a time of day that changes as the selection indicator is moved upward and downward within the calendar image.

15. The system of claim 11, wherein the first display further comprises a title region separate from and adjacent to the calendar image, the title region including therein a title or categorical description of the listing of media program representations, the title or categorical description changing when the selection indicator is moved from the current date and time within the calendar image.

16. The system of claim 11, wherein the first display further comprises a data range indicator that provides an indication on the calendar image of the dates for which program guide information is available.

17. The system of claim 11, wherein the first display further comprises a mask that is overlaid on certain dates within the calendar image, thereby highlighting other dates within the calendar image.

18. The system of claim 11, wherein the calendar image is expandable by user command.

19. The system of claim 11, wherein the program indicators appear in different shades to indicate different concentrations of the first subset of the media programs.

20. The system of claim 11, wherein the program indicators appear in different colors to indicate different concentrations of the first subset of the plurality of media programs.

21. A method of receiving electronic program guide data and television content, the method comprising:
receiving electronic program guide data;
storing the received program guide data; and
generating a first display screen based on the stored program guide data, the first display screen comprising a listing of media program representations and a calendar image displayed separate from and with the listing of media program representations, the calendar image including a plurality of dates and a selection indicator, the selection indicator movable within the calendar image, the selection indicator for selecting one of the plurality of dates on the calendar image and movable within dates on the calendar image to select a particular time, the listing of media program representations representing a plurality of media programs that are being broadcast on the selected date and time;
wherein the listing of media program representations represent a first subset of the plurality of media programs obtained by a search of the program guide data, and the calendar image further includes a plurality of program indicators, each program indicator being overlaid on one or more of the plurality of dates, thereby providing an indication of the dates on which the first subset of the plurality of media programs will be broadcast.

22. The method of claim 21, wherein the calendar image includes dates for an entire month.

23. The method of claim 21, wherein the first display screen further comprises a date region separate from the calendar image, the date region including therein a representation of a calendar date that changes as the selection indicator is moved from date to date within the calendar image.

24. The method of claim 21, wherein the first display screen further comprises a time region separate from the calendar image, the time region including therein a representation of a time of day that changes as the selection indicator is moved within the calendar image.

25. The method of claim 21, wherein the first display screen further comprises a title region separate from the calendar image, the title region including therein a title or of the listing of media program representations, the title or categorical description changing when the selection indicator is moved from the current date and time within the calendar image.

26. The method of claim 21, wherein the first display screen further comprises a data range indicator that provides an indication on the calendar image of the dates for which program guide information is available.

27. The method of claim 21, wherein the first display screen further comprises a mask that is overlaid on certain dates within the calendar image, thereby highlighting other dates within the calendar image.

28. The method of claim 21, wherein the calendar image is expandable by user command.

29. The method of claim 21, wherein the program indicators appear in different shades to indicate different concentrations of the subset of the plurality of media programs.

30. The method of claim 21, wherein the program indicators appear in different colors to indicate different concentrations of the subset of the plurality of media programs.

31. A system for transmitting and receiving electronic program guide data and television audio and video signals, the system comprising:
   a combiner for combining the program guide data and the television audio and video signals into an output data stream;
   a transmitter for broadcasting the output data stream;
   a plurality of receivers, each receiver receiving the output data stream, identifying the program guide data from the output data stream, and storing the identified program guide data; and
   display means for generating a first display screen based on the stored program guide data, the first display screen comprising a listing of media program representations and a calendar image displayed separate from and with the listing of media program representations, the calendar image including plurality of dates and a selection indicator, the selection indicator movable within the calendar image for selecting one of the plurality of dates on the calendar image and movable within dates on the calendar image to select a particular time, the listing of media program representations presenting a plurality of media programs that are being broadcast on the selected date and time;
   wherein the listing of media program representations represent a first subset of the plurality of media programs obtained by a search of the program guide data, and the calendar image further includes a plurality of program indicators, each program indicator being overlaid on one or more of the plurality of dates, thereby providing an indication of the dates on which the first subset of the plurality of media programs will be broadcast.

32. The system of claim 31, wherein the calendar image includes dates for an entire month.

33. The system of claim 31, wherein the first display screen further comprises a date region separate from the calendar image, the date region including therein a representation of a calendar date that changes as the selection indicator is moved from date to date within the calendar image.

34. The system of claim 31, wherein the first display further comprises a time region separate from the calendar image, the time region including therein a representation of a time of day that changes as the selection indicator is moved upward and downward within the calendar image.

35. The system of claim 31, wherein the first display further comprises a title region separate from and adjacent to the calendar image, the title region including therein a title or categorical description of the listing of media program representations, the title or categorical description changing when the selection indicator is moved from the current date and time within the calendar image.

36. The system of claim 31, wherein the first display further comprises a data range indicator that provides an indication on the calendar image of the dates for which program guide information is available.

37. The system of claim 31, wherein the first display further comprises a mask that is overlaid on certain dates within the calendar image, thereby highlighting other dates within the calendar image.

38. The system of claim 31, wherein the calendar image is expandable by user command.

39. The system of claim 31, wherein the program indicators appear in different shades to indicate different concentrations of media programs.

\* \* \* \* \*